US010567584B2

(12) United States Patent
Amir et al.

(10) Patent No.: US 10,567,584 B2
(45) Date of Patent: Feb. 18, 2020

(54) METHODS AND SYSTEMS FOR PROVIDING INTERACTIVE SUPPORT SESSIONS

(71) Applicant: TechSee Augmented Vision Ltd., Herzliya (IL)

(72) Inventors: Yoffe Amir, Tel-Mond (IL); Eitan Cohen, Tel Aviv (IL)

(73) Assignee: TechSee Augmented Vision Ltd., Herzliya (IL)

(*) Notice: Subject to any disclaimer, the term of this patent is extended or adjusted under 35 U.S.C. 154(b) by 0 days.

(21) Appl. No.: 16/408,011

(22) Filed: May 9, 2019

(65) Prior Publication Data
US 2019/0268473 A1 Aug. 29, 2019

Related U.S. Application Data

(63) Continuation-in-part of application No. 16/392,972, filed on Apr. 24, 2019, which is a continuation of
(Continued)

(51) Int. Cl.
*H04M 3/51* (2006.01)
*G06T 11/60* (2006.01)
(Continued)

(52) U.S. Cl.
CPC ......... *H04M 3/5183* (2013.01); *G06F 3/048* (2013.01); *G06T 1/20* (2013.01); *G06T 11/60* (2013.01);
(Continued)

(58) Field of Classification Search
CPC ......... G06F 3/048; G06Q 30/016; G06T 1/20; G06T 11/60; H04L 65/4007;
(Continued)

(56) References Cited

U.S. PATENT DOCUMENTS 10,182,153 B2 * 1/2019 Amir .................... H04M 3/5183
10,397,404 B1 * 8/2019 Amir ....................... G06T 11/60
(Continued)

FOREIGN PATENT DOCUMENTS

EP         0943972       9/1999
WO     WO 2007/066166    6/2007
WO     WO 2009/036782    3/2009

*Primary Examiner* — Harry S Hong
(74) *Attorney, Agent, or Firm* — Finnegan, Henderson, Farabow, Garrett & Dunner LLP

(57) ABSTRACT

An image processing system including at least one processor configured to receive at least one first image of an inoperative product captured by a mobile device of a user; perform image analysis on the first image to identify a status of a functional element associated with the inoperative product; access memory to determine why the product is inoperative; cause visual guidance to be displayed by the mobile device, wherein the visual guidance is associated with a plurality of sequential actions for causing the inoperative product to become operative; receive at least one second image of the product, the second image being indicative of a completion of the plurality of sequential actions; perform image analysis on the at least one second image to determine that the completion of the plurality of sequential actions caused the inoperative product to become operative; and notify the user that the problem has been resolved.

20 Claims, 24 Drawing Sheets

Related U.S. Application Data application No. 16/196,818, filed on Nov. 20, 2018, now Pat. No. 10,313,523, which is a continuation of application No. 15/366,483, filed on Dec. 1, 2016, now Pat. No. 10,182,153.

(60) Provisional application No. 62/669,407, filed on May 10, 2018.

(51) Int. Cl.
| | |
|---|---|
| *G06F 3/048* | (2013.01) |
| *H04L 29/06* | (2006.01) |
| *G06T 1/20* | (2006.01) |
| *H04M 7/00* | (2006.01) |
| *G06Q 30/00* | (2012.01) |

(52) U.S. Cl.
CPC ...... *H04L 65/1069* (2013.01); *H04L 65/4007* (2013.01); *G06Q 30/016* (2013.01); *H04L 65/4015* (2013.01); *H04M 7/0045* (2013.01); *H04M 2201/50* (2013.01); *H04M 2203/651* (2013.01)

(58) Field of Classification Search
CPC ............. H04L 65/4984; H04L 65/1069; H04L 65/4015; H04M 3/5183; H04M 7/0045; H04M 2201/50; H04M 2203/651
USPC ..... 379/201.01, 265.01, 265.09, 266.01, 309
See application file for complete search history.

(56) References Cited

U.S. PATENT DOCUMENTS

| | | | |
|---|---|---|---|
| 2002/0044104 | A1 | 4/2002 | Friedrich et al. |
| 2008/0030575 | A1 | 2/2008 | Davies |
| 2013/0278635 | A1 | 10/2013 | Maggiore |
| 2017/0308751 | A1* | 10/2017 | Kim .................... G06K 9/00671 |
| 2018/0159979 | A1* | 6/2018 | Amir .................... H04M 3/5183 |
| 2019/0268470 | A1* | 8/2019 | Amir ........................ G06F 3/048 |
| 2019/0268472 | A1* | 8/2019 | Amir .................... H04L 65/1069 |
| 2019/0268571 | A1* | 8/2019 | Pettersen ......... G08B 13/19689 |
| 2019/0278992 | A1* | 9/2019 | Hossain ................ G06F 16/903 |

\* cited by examiner

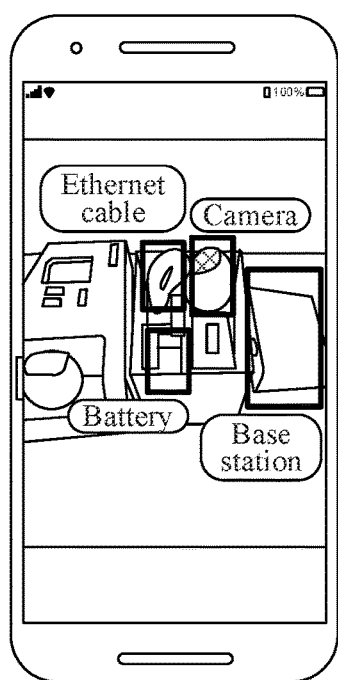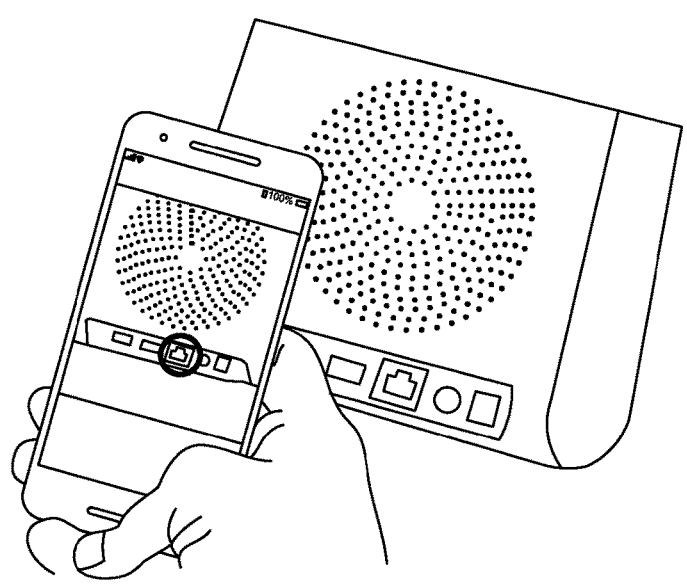
FIG. 11B                    FIG. 11C

METHODS AND SYSTEMS FOR PROVIDING INTERACTIVE SUPPORT SESSIONS

CROSS REFERENCE TO RELATED APPLICATIONS

This application is a continuation-in-part of U.S. patent application Ser. No. 16/392,972, filed Apr. 24, 2019, which is a continuation of U.S. patent application Ser. No. 16/196,818, filed Nov. 20, 2018, which is a continuation of U.S. patent application Ser. No. 15/366,483, filed Dec. 1, 2016 (now U.S. Pat. No. 10,182,153). This application also claims priority to U.S. Provisional Patent Application No. 62/669,407, filed on May 10, 2018, all of which are incorporated herein by reference.

TECHNOLOGICAL FIELD

The present disclosure generally relates to the field of image processing, and particularly relates to systems and methods for using image processing to assist a user with technical support.

BACKGROUND

Technical support systems utilized nowadays make it difficult for digital service providers (DSPs), and especially for service/technical support centers, to provide efficient (in terms of time and customer satisfaction) technical support services to their customers. Despite a recent push toward self-service schemes, customer have been slow to adopt self-service technologies. Today's customers support model and relevant technologies are subject to the numerous challenges, including increasingly complex customer needs, communication gaps, diagnosis challenges, limited problem solving rates, and customer frustration.

The techniques disclosed in this disclosure aim to provide remote efficient consumer support services and reduce the incidence of technician dispatch. These techniques are useful for shortening consumer wait time, improving installation and repair outcomes, and improving customer satisfaction and independence.

SUMMARY

One aspect of the disclosure provides an image processing system for visually augmenting a real-time video stream, the image processing system, comprising: at least one processor configured to: receive the real-time video stream captured by an image sensor, the real-time video stream including images of at least one cable and an electronic appliance; analyze the real-time video stream to identify a plurality of ports in the electronic appliance; analyze the real-time video stream to identify a specific cable for association with a specific port of the plurality of ports; cause a movable augmented indicator to display on the real-time video stream, wherein the movable augmented indicator is configured to guide a user's connection of the specific cable to the specific port; monitor in the real-time video stream changing locations of the specific port as the image sensor moves relative to the electronic appliance; and adjust positions of the movable augmented indicator to account for the changing locations of the specific port in the real-time video stream Another aspect of the disclosure provides a non-transitory computer readable medium including instructions for visually augmenting a real-time video stream, the instructions being executable by at least one processor to cause the at least one processor to perform a method, the method comprising: receiving the real-time video stream captured by an image sensor, the real-time video stream including images of at least one cable and an electronic appliance; analyzing the real-time video stream to identify a plurality of ports in the electronic appliance; analyzing the real-time video stream to identify a specific cable for association with a specific port of the plurality of ports; causing a movable augmented indicator to display on the real-time video stream, wherein the movable augmented indicator is configured to guide a user's connection of the specific cable to the specific port; monitoring in the real-time video stream changing locations of the specific port as the image sensor moves relative to the electronic appliance; and adjusting positions of the movable augmented indicator to account for the changing locations of the specific port in the real-time video stream.

Another aspect of the disclosure provides a method for visually augmenting a real-time video stream captured by an image sensor, the method comprising: receiving the real-time video stream captured by an image sensor, the real-time video stream including images of at least one cable and an electronic appliance; analyzing the real-time video stream to identify a plurality of ports in the electronic appliance; analyzing the real-time video stream to identify a specific cable for association with a specific port of the plurality of ports; causing a movable augmented indicator to display the real-time video stream, wherein the movable augmented indicator is configured to guide a user's connection of the specific cable to the specific port; monitoring in the real-time video stream changing locations of the specific port as the image sensor moves relative to the electronic appliance; and adjusting positions of the movable augmented indicator to account for the changing locations of the specific port in the real-time video stream.

Another aspect of the disclosure provides an image processing system employing artificial intelligence during technical support, the image processing system comprising: at least one processor configured to: receive image data captured by an image sensor of a mobile device, the image data including images of an inoperative appliance in an environment of a user; perform image recognition on the image data to identify the inoperative appliance and a likely cause of inoperability; retrieve a plurality of sequential instructions to be provided for enabling a user to complete a plurality of sequential actions in order to remedy the inoperability; cause the mobile device to sequentially display the plurality of sequential instructions; detect that the inoperative appliance is outside a field of view of the image sensor, based on the image data and during execution of the sequential actions; suspend display of additional sequential instructions when the inoperative appliance is outside of the field of view; detect when the inoperative appliance returns to the field of view after suspending display; and resume display of sequential instructions after the inoperative appliance is detected to return to the field of view.

Another aspect of the disclosure provides a non-transitory computer readable medium including instructions for employing artificial intelligence during technical support, the instructions being executable by at least one processor to cause the at least one processor to perform a method, the method comprising: receiving image data captured by an image sensor of a mobile device, the image data including images of an inoperative appliance in an environment of a user; performing image recognition on the image data to identify the inoperative appliance and a likely cause of inoperability; retrieving a plurality of sequential instructions to be provided for enabling a user to complete a plurality of sequential actions in order to remedy the inoperability; causing the mobile device to sequentially display the plurality of sequential instructions; detecting that the inoperative appliance is outside a field of view of the image sensor based on the image data and during execution of the sequential actions; suspending display of additional sequential instructions while the inoperative appliance is outside of the field of view; detecting when the inoperative appliance returns to the field of view after suspended display; and resuming display of the additional sequential instructions after detecting that the inoperative appliance has returned to the field of view.

Another aspect of the disclosure provides a method for employing artificial intelligence during technical support, the method comprising: receiving image data captured by an image sensor of a mobile device, the image data including images of an inoperative appliance in an environment of a user; performing image recognition on the image data to identify the inoperative appliance and a likely cause of inoperability; retrieving a plurality of sequential instructions to be provided for enabling a user to complete a plurality of sequential actions in order to remedy the inoperability; causing the mobile device to sequentially display the plurality of sequential instructions; detecting that the inoperative appliance is outside a field of view of the image sensor based on the image data and during execution of the sequential actions; suspending display of additional sequential instructions while the inoperative appliance is outside of the field of view; detecting when the inoperative appliance returns to the field of view after suspended display; and resuming display of the additional sequential instructions after detecting that the inoperative appliance has returned to the field of view.

Another aspect of the disclosure provides an image processing system employing artificial intelligence to electronically guide a technical support session, the image processing system comprising: at least one processor configured to: receive real-time image data captured by an image sensor of a mobile device at a location of an inoperative product, the real-time image data including at least one image of the inoperative product; perform image recognition on the real-time image data to identify a likely source of inoperability of the product; cause the mobile device to display a plurality of sequential instructions for mitigating inoperability of the product; determine that an error was made while performing the particular instruction, based on additional real-time image data captured following the display of a particular one of the plurality of sequential instructions; cause the mobile device to display an error notification when the particular instruction is not complied with, wherein the error notification being displayed before a subsequent instruction is displayed; determine that the particular instruction was subsequently complied with based on real-time image data captured following the notification; and cause the mobile device to display the subsequent instruction of the plurality of sequential instructions after the particular instruction is determined to have been complied with.

Another aspect of the disclosure provides a non-transitory computer readable medium including instructions for electronically guiding a technical support session, the instructions being executable by at least one processor to cause the at least one processor to perform a method, the method comprising: receiving real-time image data captured by an image sensor of a mobile device at a location of an inoperative product, the real-time image data including at least one image of the inoperative product; performing image recognition on the real-time image data to identify a likely source of inoperability of the product; causing the mobile device to display a plurality of sequential instructions for mitigating the inoperability; determining that an error was made in performing the particular instruction based on additional real-time image data acquired after the particular one of the plurality of sequential instructions is displayed; causing the mobile device to display an error notification when the particular instruction is not complied with, wherein the error notification being displayed before a subsequent instruction is displayed; determining that the particular instruction was subsequently complied with based on real-time image data captured following the notification; and causing the mobile device to display the subsequent instruction of the plurality of sequential instructions after determining that the particular instruction was complied with.

Yet another aspect of the disclosure provides a method for electronically guiding a technical support session, the method comprising: receiving real-time image data captured by an image sensor of a mobile device at a location of an inoperative product, the real-time image data including at least one image of the inoperative product; performing image recognition on the real-time image data to identify a likely source of inoperability of the product; causing the mobile device to display a plurality of sequential instructions for mitigating inoperability of the product; determining that an error was made in performing the particular instruction based on additional real-time image data captured following the display of a particular one of the plurality of sequential instructions; causing the mobile device to display an error notification when the particular instruction is not complied with, wherein the error notification being displayed before a subsequent instruction is displayed; determining that the particular instruction was subsequently complied with based on real-time image data captured following the notification; and causing the mobile device to display the subsequent instruction of the plurality of sequential instructions after determining that the particular instruction was subsequently complied with.

Yet another aspect of the disclosure provides a non-transitory computer readable medium for assisting a user during technical support, the computer readable medium including instructions that, when executed by at least one processor, cause the at least one processor to perform a method, the method comprising: receiving at least one first image of an inoperative product captured by a mobile device of a user; performing image analysis on the at least one first image to identify in the at least one first image a status of a functional element associated with the inoperative product; accessing memory to determine a reason why the product is inoperative based on the determined status of the functional element; causing visual guidance to be displayed by the mobile device, wherein the visual guidance is associated with a plurality of sequential actions for causing the inoperative product to become operative; receiving at least one second image of the product, the second image being indicative of a completion of the plurality of sequential actions; performing image analysis on the at least one second image to determine that the completion of the plurality of sequential actions caused the inoperative product to become operative; and providing a notification to the user indicating problem resolution.

Yet another aspect of the disclosure provides an image processing system employing artificial intelligence for assisting a user during technical support, the image processing system, comprising: at least one processor configured to:

receive at least one first image of an inoperative product captured by a mobile device of a user; perform image analysis on the at least one first image to identify in the at least one first image a status of a functional element associated with the inoperative product; access memory to determine a reason why the product is inoperative based on the determined status of the functional element; cause visual guidance to be displayed by the mobile device, wherein the visual guidance is associated with a plurality of sequential actions for causing the inoperative product to become operative; receive at least one second image of the product, the second image being indicative of a completion of the plurality of sequential actions; perform image analysis on the at least one second image to determine that the completion of the plurality of sequential actions caused the inoperative product to become operative; and provide a notification to the user indicating problem resolution.

Yet another aspect of the disclosure provides a method for assisting a user during technical support, the method comprising: receiving at least one first image of an inoperative product captured by a mobile device of a user; performing image analysis on the at least one first image to identify in the at least one first image a status of a functional element associated with the inoperative product; accessing memory to determine a reason why the product is inoperative based on the determined status of the functional element; causing visual guidance to be displayed by the mobile device, wherein the visual guidance is associated with at least one action for causing the inoperative product to become operative; receiving at least one second image of the product, the second image being indicative of a completion of the at least one action; performing image analysis on the at least one second image to determine whether the at least one action was completed properly; and notifying the user when the at least one action is completed properly.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 1A to 1C schematically illustrate support sessions according to some possible embodiments, wherein FIG. 1A is a sequence diagram showing possible stages in the communication establishment and FIGS. 1B and 1C schematically illustrate exchange of video streams between a remote user and a support center;

FIGS. 11A-11F illustrate an application of the image processing system in accordance with embodiments of the disclosure;

DETAILED DESCRIPTION

Figure 1A:
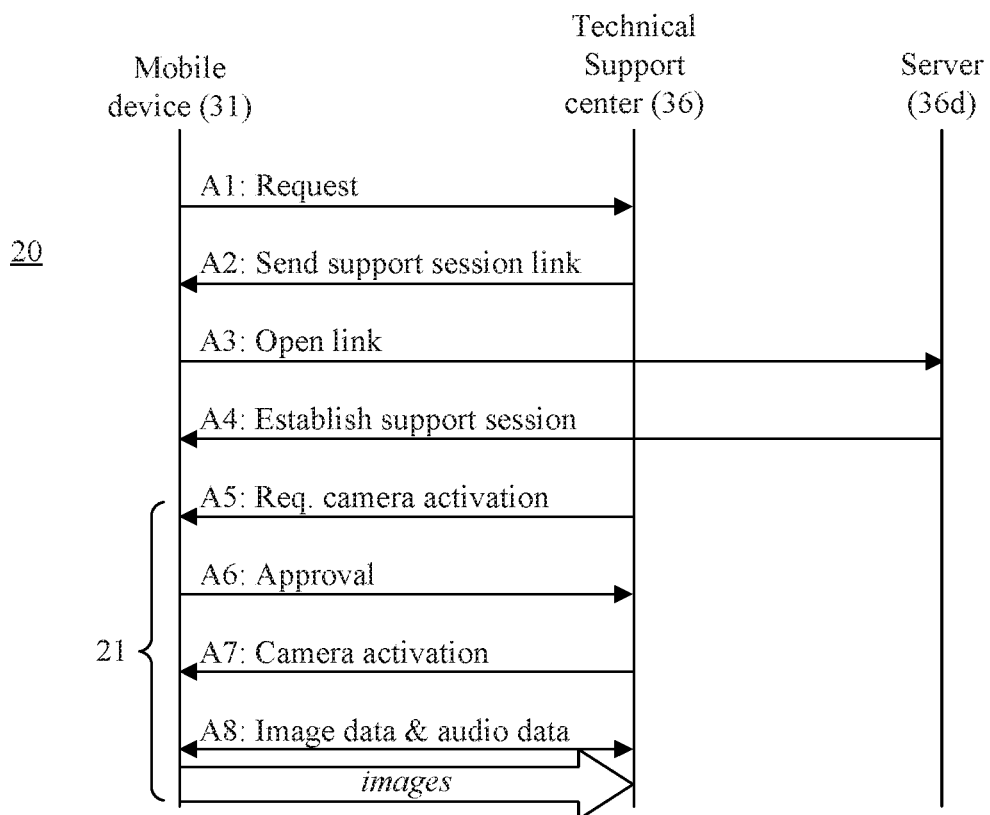

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure provides remote assistance techniques for efficiently identifying technical problems, defects and improper equipment configurations, and determining a most likely solution to resolve them. In one non-limiting example, the techniques disclosed herein can be used in interactive applications to assist with the installation and troubleshooting of various items, including, furniture, consumer electronics, and appliances. Such technologies may utilize live, person-to-person video aided support and minimize consumer dissatisfaction and frustration.

In some embodiments, a processor of the system may receive image data captured by an image sensor of a mobile device. The term "mobile device" as used herein refers to any device configured to communicate with a wireless network, including, but not limited to a smartphone, tablet, mobile station, user equipment (UE), personal digital assistant, laptop, wearable sensor, e-Readers, dedicated terminals, smart glasses and any other movable device that enables communication with a remote server.

In some embodiments, the image data is captured by an image sensor. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the mobile device. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by the image sensor may be transmitted by wired or wireless transmission to a remote server.

In some embodiments, the received image data may be a "real-time" video stream. The term "real-time" pertains to on-going image data which closely approximates events as they are occurring. Such real-time video streams or "live" feeds allow, for example, a user to record an ongoing issue, installation, or repair at one location, and a remote customer service agent to visualize the ongoing issue, installation or repair.

In some embodiments the image data may be annotated. The term "annotation" pertain to symbols, text, images or other visual aids for guiding the user during a technical support session.

In some embodiments, the received image data may include images of an electronic appliance. The electronic appliance may include one or more functional elements. The term "functional element" means any component of an electrical appliance that aids in the function or operation of the appliance. Such elements may include, for example, jacks, ports, cables, buttons, triggers, indicator lights and switches.

In some embodiments, the electronic appliance may be inoperative. The term "inoperative appliance" pertains to electrical appliances that are non-operational because of non-assembly, defective assembly, defective installation or other defect. Such an appliance may be inoperative because it has not been plugged into a working electric source, because it has not been switched on or because a cable is in the wrong port (e.g., input instead of output).

In some embodiments, a processor of the system may cause the mobile device to display visual guidance for mitigating inoperability of a product (e.g. electrical appliance, furniture etc.). The term "visual guidance" pertains to any visual aid for directing a user to a particular component or group of components of the product (e.g., legs of a table or port of a cable box).

There is an ongoing demand for efficient customer service centers capable of quickly diagnosing and efficiently resolving problems encountered by their remote users. Traditional voice call support paradigms are rarely capable of establishing efficient and cost effective customer support centers. These conventional telephone voice call based support centers identify a limited number of user issues through tedious interrogation of their remote end users. In many instances an information gap exists between the center and the user. The end user may be incapable of correctly defining their problems/difficulties and thus unable to provide the support center with meaningful information for solving it. As a result, the center must dispatch a skilled technician to resolve the problem at the user's remote site (e.g., home, office, etc.).

The present application provides systems and methods for closing the information gap by enabling support centers to quickly identify product defects and other issues at the remote user's site, and for rendering fast and accurate working solutions. The amount of information exchanged between the remote end user and the support center is facilitated through use of a mobile device that allows for the exchange of image data and sound.

Upon establishing a video support session, the support center processes and analyzes the sounds and image data received from the remote end user. The support center provides tools for conveying instructions to the remote user. For example, where image data is comprised of one or more still images, the support center may add annotations, e.g., text, signs and/or symbols to the image data. Where image data is comprised of real-time video stream or video frames, the support center may superimpose a movable augmented indicator onto the image data. The annotated or superimposed image data is presented on the display of the user's mobile device. When the remote user successfully resolves the problem by following the annotated/superimposed instructions, the problem and solution is stored in a cloud or other database record system. By storing various problems and solutions, a database of working solutions is gradually established. The database may be used by the support center to more quickly and efficiently solve future problems. Alternatively, the database may form an artificial intelligence, whereby the artificial intelligence and not an agent of the support center solves the problem using the image data and relays the instructions to the user using annotations or a moveable augmented indicator as described above.

The disclosed methods and systems utilize computer vision tools having tracking capabilities for identifying complex objects/elements within a mobile device field of view, and for allowing tracking of such complex objects in sophisticated/challenging visioning conditions (e.g., poor lighting, poor resolution and noisy conditions). In some embodiments these capabilities are implemented by use of neural network tools. This way a multitude (e.g., thousands) of video streams can be analyzed by systems implementing the techniques disclosed herein to assist in the technical support sessions thereby conducted.

The present application thus provides systems and methods for conducting remote technical support sessions and real-time instructions. The methods and systems disclosed herein allow a technical support agent to see, in real-time, image data captured by the user's mobile device, and to provide real-time solutions.

Various tools continuously maintain the database records and discard database records that are not relevant or valid, inefficient, and/or rendered obsolete, and to facilitate real time matching of best working solutions from the database records to ongoing support sessions conducted by the support center. The techniques disclosed herein can be thus used to develop artificial intelligence (e.g., visual cellular chat-bots) configured to provide automated customer support services.

Optionally, the video support session between the support center and the user's device may be activated by the user after receiving an activation link embedded in a text message (e.g., SMS, WhatsApp, email etc.) sent from the support center. By clicking on/accessing the embedded link the user opens the support session described herein and establishes the video support session communication with the support center. Optionally, the support session is achieved by means of an application installed on the user's device and configured to establish the video support session communication with the support center.

Support sessions techniques and systems are disclosed, wherein a bidirectional video communication is established between a technical support person and a remote user to provide additional layers of information exchange therebetween, thereby expanding the abilities of the system to detect issues/defects in appliances, objects and equipment, and of illustratively conveying solutions to the remote end-user. The bidirectional video communication can be achieved without requiring installation of a dedicated video support session application in the user's device. In some embodiments, after a telephone call is received from the remote user, the expert/agent verifies that the end-user owns a smartphone, and then sends a link (e.g., embedded in a text message) to the user's device. The bidirectional video stream is established once the customer clicks on the link received from the support center. The bidirectional video communication enables the expert/agent to see the environment at the remote site of the user, as captured by the back camera of the user's device, and thereby allows providing the remote user with substantially accurate instructions for resolving the encountered problem.

Figure 1B:
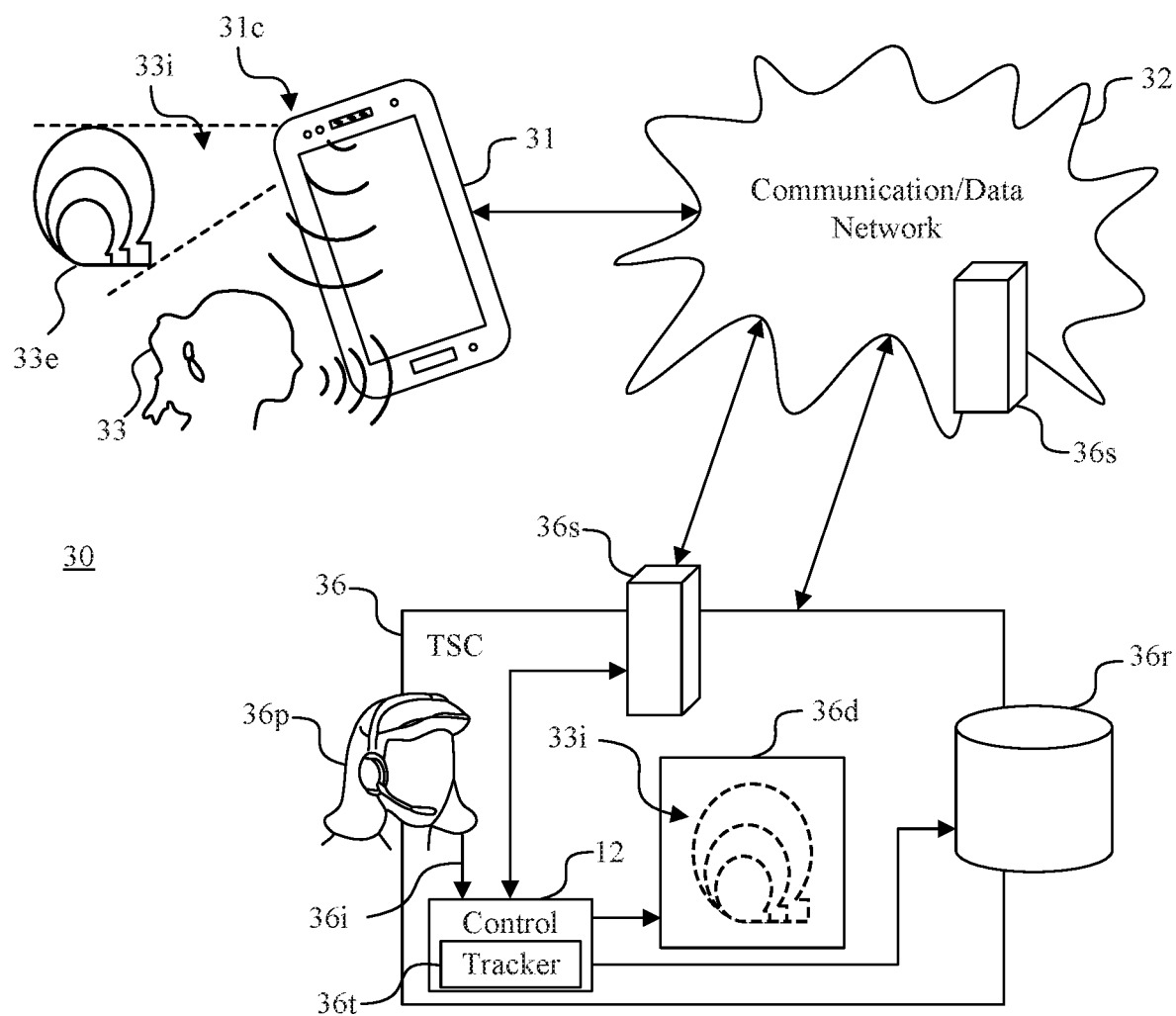
Figure 1C:
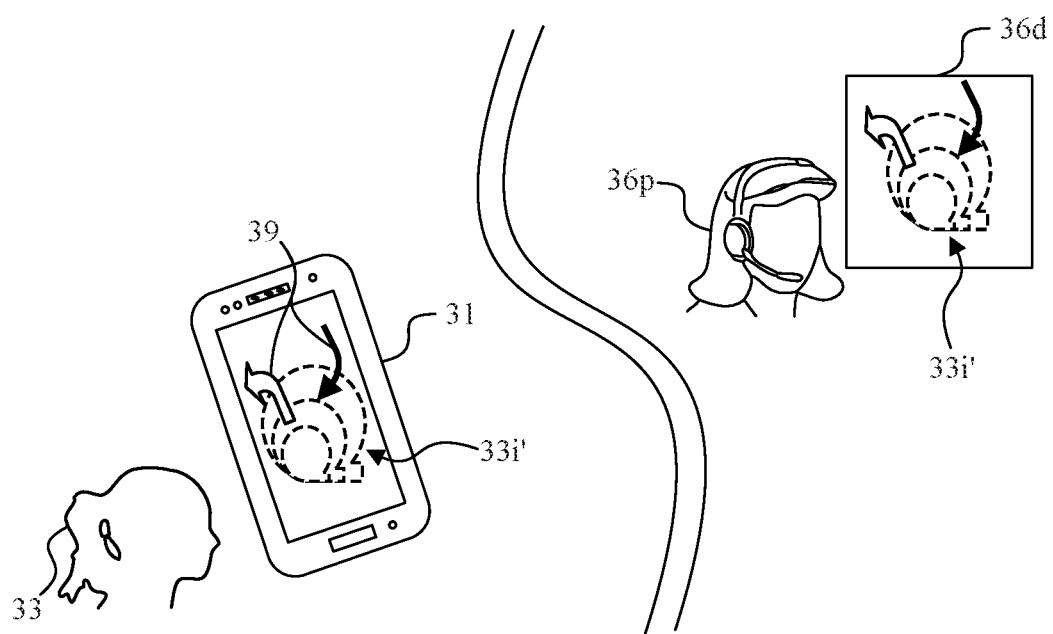

FIGS. 1A-1C schematically illustrate support sessions in accordance with certain embodiments. Turning to the figures, FIG. 1A depicts a diagram illustrating various steps of a support session 20 and FIGS. 1B and 1C illustrate communications between a remote user 33 and an agent 36p of a technical support center (TSC) 36 during a video support session 20. Support session 20 is initiated when a user 33 calls or otherwise contacts TSC 36 using a mobile device 31. Initiation (step A1) may be performed over a cellular and/or landline network, or other communication channels e.g., satellite communication, voice over IP, etc. When a call is received, TSC 36 sends a message (step A2) to the mobile device 31. The message may be SMS, email, WhatsApp, etc. and comprises a link (e.g. URL) for commencing a the support session. Upon opening the link (step A3), mobile device 31 accesses a remote server 36s over a data network 32, wherefrom video support session 21 setup instructions/code are sent to the mobile device 31 to establish the session (step A4). The remote server 36s may be implemented as part of the support center and/or in a cloud computing infrastructure accessible for both the users and the support center.

Once the code is entered/instructions followed, the support session begins. Agent 36p may request the user's permission to access and activate an image sensor, e.g. camera, on the mobile device 31 (step A5). Once user 33 approves the request (step A6), the camera is activated (step A7). User 33 may describe the problem and/or reasons for which the support is needed after which agent 36p may direct user 33 to direct the camera on the impaired equipment, appliance or other object of interest 33e. The session enables agent 36p to simultaneously view image data 33i received by mobile device 31 and speak with the user (audio-visual support) (step A8). Image data 33i includes the impaired equipment, appliance, or other object of interest and is displayed on a display device 36d at TSC 36 for agent 36p to see. Image data 33i may include real time video, still images, etc. and may or may not include audio support depending on agent/user preference or network bandwidth. Support session 20 may be conducted iteratively in real time until the user's problem is resolved. If the agent is unable to resolve the user's problem, a skilled technician might be sent to resolve the user's problem.

The techniques described herein enable agent 36p to superimpose annotations and/or moveable augmented indicators (markers) on the image data in real time. The markers and/or annotations may be created manually or selected from a pre-prepared library. These markers/annotations are superimposed on the object of interest and/or a functional element thereof within the image data during the video session. This may be achieved using a video tracker 36t so that the markers/annotations remain anchored to the object even if image sensor 31c moves relative to object 33e. Video tracker 36t may be implemented in a control unit 12, or configured to operate in a remote server/the cloud. Tracker 36t is configured and operable to track one or more objects 33e within image data 33i received from the remote user 33 and re-acquire the tracked object if it disappears from the image sensor's field of view and reappears due to movements of the image sensor 31c.

Video tracker 36t is configured to track the relevant objects/elements within the image data and to anchor annotations/markers when they move within the image data. Anchoring the annotations/marker to the object or particular element of the object allows the user to better track the object/element of interest, thereby facilitating assembly or repair thereof. In some embodiments, the object is annotated/marked using a computer vision tool. When the image data is received, the algorithm may identify its functional elements and brand. Once the identification is verified by the agent or through speech analysis, the data is marked accordingly.

Alternatively, snapshots of image data 33i may be taken and markers or annotations may be superimposed on the snapshots, then sent to the user. Image data 33i and data related to the support session, e.g., repair time, assembly time, solutions, annotations, markers, etc. may be saved to one or more databases 36r. Optionally, image data may be filtered so that background images, e.g., the room in which the object is located, are removed.

As show in FIG. 1B, TSC 36 may include control unit 12. Control unit 12 is configured and operable to display the image data received from mobile device 31 on display device 36d and provide agent 36p with image processing tools for adding the annotations or markers onto the image date received from mobile device 31. Control unit 12 is further configured and operable to send the annotated/augmented image data 33i' to the mobile device 31. In this way, the user is able to view the annotations/markers on the mobile device.

FIG. 1B further illustrates server 36s. Server 36s is used to conduct the video support session between user 33 and TSC 36, and may be implemented in the TSC 36, and/or in remote data network 32, e.g., in a server farm or in a cloud computing environment. Optionally, the remote server may also be configured to carry out some of the tasks of the control unit 12, such as but not limited to, AR functionality, tracker functionality, image recognition and/or processing.

As illustrated in FIG. 1C, TSC 36 may provide agent 36p with augmented reality tools for superimposing real-time annotations and/or markers 39 onto the image data acquired by the mobile device image sensor 31c. The annotations and/or markers can be manually added to the image data using a pointing/mouse device and draw tool/module, and/or any image processing utility having freehand abilities. The annotated image data 33i' is then transferred over the data network 32 to the user's mobile 31 and displayed before the user.

Additionally, or alternatively, the agent 36p may select pre-defined annotations and/or markings and place them in the acquired image data 33i. In some embodiments an embedded video tracker is used to superimpose the annotations and/or markers 39 onto a desired object 33e within the image data. The tracker may move and/or resize the annotations and/or markers 39 whenever the image sensor 31c moves relative to object 33e. In this way, the position and/or size and of the annotations/markers may change in response to relative movement between image sensor 31c and object 33*e*. In some embodiments, AR tools may be used to create an associative connection between two or more objects in image data 33*i*. For example, an arrow may be superimposed between a particular cable and a particular functional element, e.g., port, of the object, to inform the user that the designated cable needs to be inserted into the designated port.

Using these techniques, a bidirectional video communication is established whereby the agent 36*p* is provided with image data 33*i* depicting the setup/configuration of the impaired appliance, equipment or object 33*e*, and the user 33 is provided with instructive annotated and/or augmented image data 33*i*'.

In some embodiments, TSC 36 is configured to record the video support sessions 21 in a database 36*r*. This way, the TSC 36 builds a continuously growing audio/visual database of user problems, and of their corresponding working solutions. The database may be used by computer vision tools to facilitate resolving of user's problems in future technical support sessions. Optionally, database 36*r* may be stored in a network computer/server of the TSC 36 (e.g., in the cloud).

Figure 2:
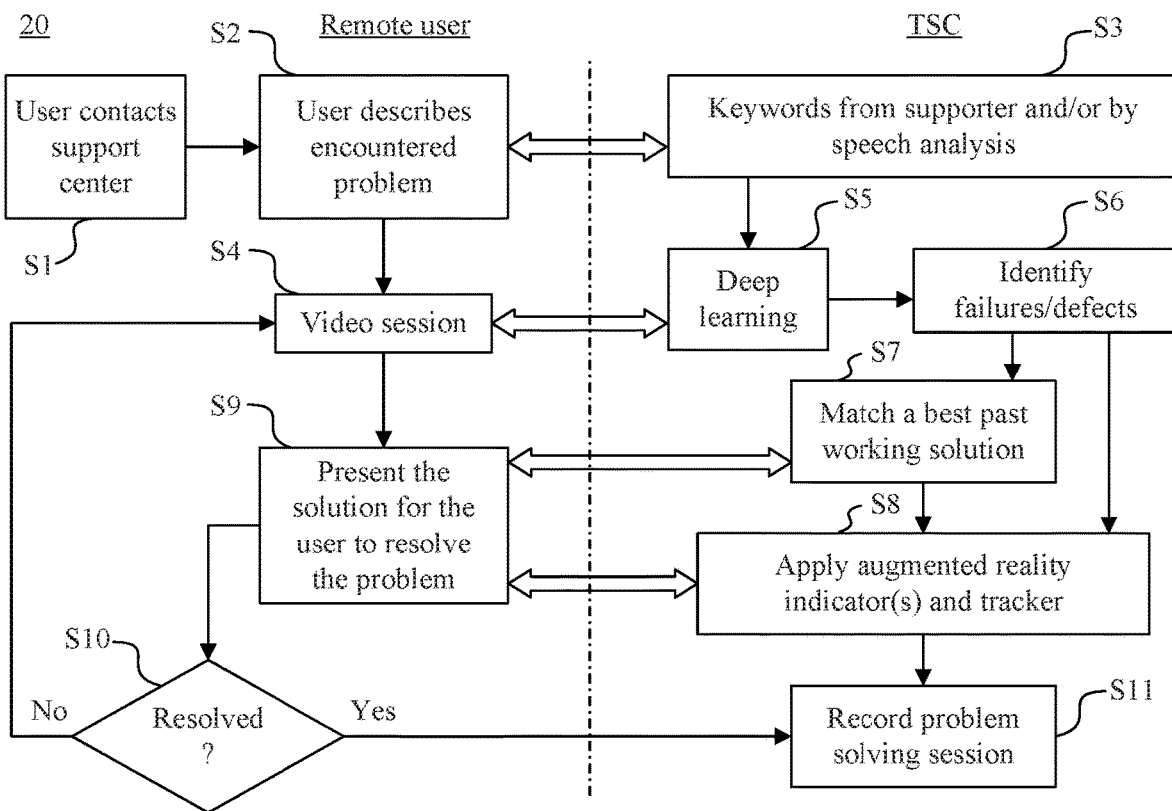
FIG. 2 is a functional flowchart schematically illustrating a support session according to some possible embodiments.

FIG. 2 is a functional flowchart illustrating support session 20 in accordance with some embodiments. The support session 20 commences when user 33 contacts TSC 36 to describe a particular issue (step S1). Where the user 33 calls the TSC 36 and verbally describes the issue (step S2), auditory signals received from user 33 are processed and analyzed by speech analysis tools to extract keywords therefrom (step S3). These keywords are associated with the issues at hand and are indicative of the type of equipment, appliance, object, etc. 33*i* needing support. faulty item/equipment and/or the nature of the encountered problem.

After TSC 36 receives enough information from user 33, an audio/visual support session is established (step S4). Image data 33*i* received from user mobile device 31 is processed by the TSC 36 using a deep learning algorithm to detect the problematic appliance, equipment or object 33*e* in the image data (step S5), and to identify possible issues/defects causing the problem encountered by the remote user 33 (step S6).

Optionally, TSC 36 may utilize an embedded on-line computer vision tool configured and operable to automatically identify the relevant objects in the image data 33*i*, and/or identify codes, text and other symbols onto object 33*e* to thereby enable TSC 36 to identify the type, make, serial number etc. of the faulty object 33*e*. In some embodiments, agent 36*p* may guide the computer vision tools as to what objects to look for in image data 33*i*. For example, agent 36*p* may guide a cursor of a pointing device (e.g. a mouse) on/near the objects/elements thereof.

Additionally, or alternatively, speech analysis tools may be used to analyze the user's speech to identify keywords within the speech and aid the computer vision tool as it processes image data 33*i* for relevant objects/elements within the image sensor field of view. For example, if the speech recognition tool identifies words such as internet/network and communication/connectivity in the user' speech, it may guide the computer vision tool to look for LAN sockets or cables, Wi-Fi antennas and/or LEDs indications. Optionally, the keywords may be typed by agent 36*p*. Upon identifying the relevant objects in the image data 33*i*, the TSC system using the computer vision tool can analyze the object's setup/configuration and automatically identify potential issues/defects therein. Display device 36*d* may be used to present to the identified object to the agent.

Once the issue is identified, agent 36*p* may instruct the user on how to solve it. If the solution is relatively simple, (e.g., press the power switch), agent 36*p* may provide verbal instructions. If user 33 is unable to carry out the verbal instructions, or the instructions are relatively complex, agent 36*p* may generate an instructive augmented reality video stream using one or more markers 39 and trackers (step S8). The markers are superimposed onto the image data and displayed on the user's mobile device in real time to provide additional guidance. The agent may alternatively superimpose annotations as discussed and described above with respect to FIGS. 1A-1C.

Optionally, TSC 36 may query database 36*r* for a best working solution (step S7), based on the object's determined issues/defects, and transmits the best working solution to user 33. The instructions may comprise textual, auditory and/or annotated/augmented content. Agent 36*p* may provide user 33 with some (including one) or all types of instructive content, and/or limit the content to include some or the entire set of instructions.

After presenting proposed solution(s) to user 33 via mobile device 31 (step S9), the user performs the instructions received from the TSC 36. During this stage, image data 33*i* is continuously streamed from user's device 31, thereby allowing agent 36*p* to supervise and verify whether user 33 is following the instructions correctly, and provide corrective guidance if user 33 performs an action incorrectly. If the instructions provided do not resolve the problem, agent 36*p* may attempt to detect alternative issues/defects. If user 33 is able to resolve the problem using the provided solution, data relating to the support session 20 is recorded in the database 36*r* at the TSC 36 (step S11). The new record 51 may include data related to the resolved problem, e.g. keywords used by the system to identify the issues/defects, the objects/elements in which the issues/defects were found, and image data 33*i* received by the TSC 36 and/or annotated/augmented image data 33*i*' conveyed to the remote user for resolving the problem.

The TSC is configured to use image data 33*i* to learn the nature of the issue/defect encountered, the best working solutions based on previous related sessions, and construct database records cataloguing the successful solutions. Database 36*r* is configured to continuously produce increasingly efficient solutions and improve customer satisfaction.

Periodic/intermittent maintenance procedures may be used to guarantee the effectiveness and validity of the records stored in the database. In some embodiments each database record is monitored during the maintenance procedures to determine its successful problem resolving percentage (rank) in real-time technical support sessions 20. For example, each solution may be ranked/scored according to the total number of times it was successfully used to resolve a specific problem or the total number of times it failed to resolve the problem. In some embodiments, maintaining the database further comprises discarding low-ranking solutions and only maintaining high-ranking solutions. Such database maintenance procedures increase the chances of successfully resolving user problems in future technical support sessions by using the good working examples used in the past to resolve the same problems.

Big data mining algorithms (dedicated for images and video i.e., video analytics tools) can be used to continuously monitor the database to sort and classify the problems and solutions that form the base line for the deep learning algorithms. Initially, mining may be done manually, whereby the agent scans the most relevant support sessions and classifies them according to problems they dealt with. Next, using the mining algorithm, the TSC may scan the support sessions and classify them automatically based on the keywords, objects/elements identified in the session. In some embodiments snapshots of the image data are automatically taken and the objects/elements therein are classified and added to the database for the computer vision tool discussed above. Optionally, image data 33*i* may be filtered so that background images, e.g., the room in which the object is located, are removed.

Deep learning algorithms can be used to analyze classified image data, and deliver the best working solution based on the "lessons" learned from all the past support sessions related to a certain class of problem.

Figure 3:
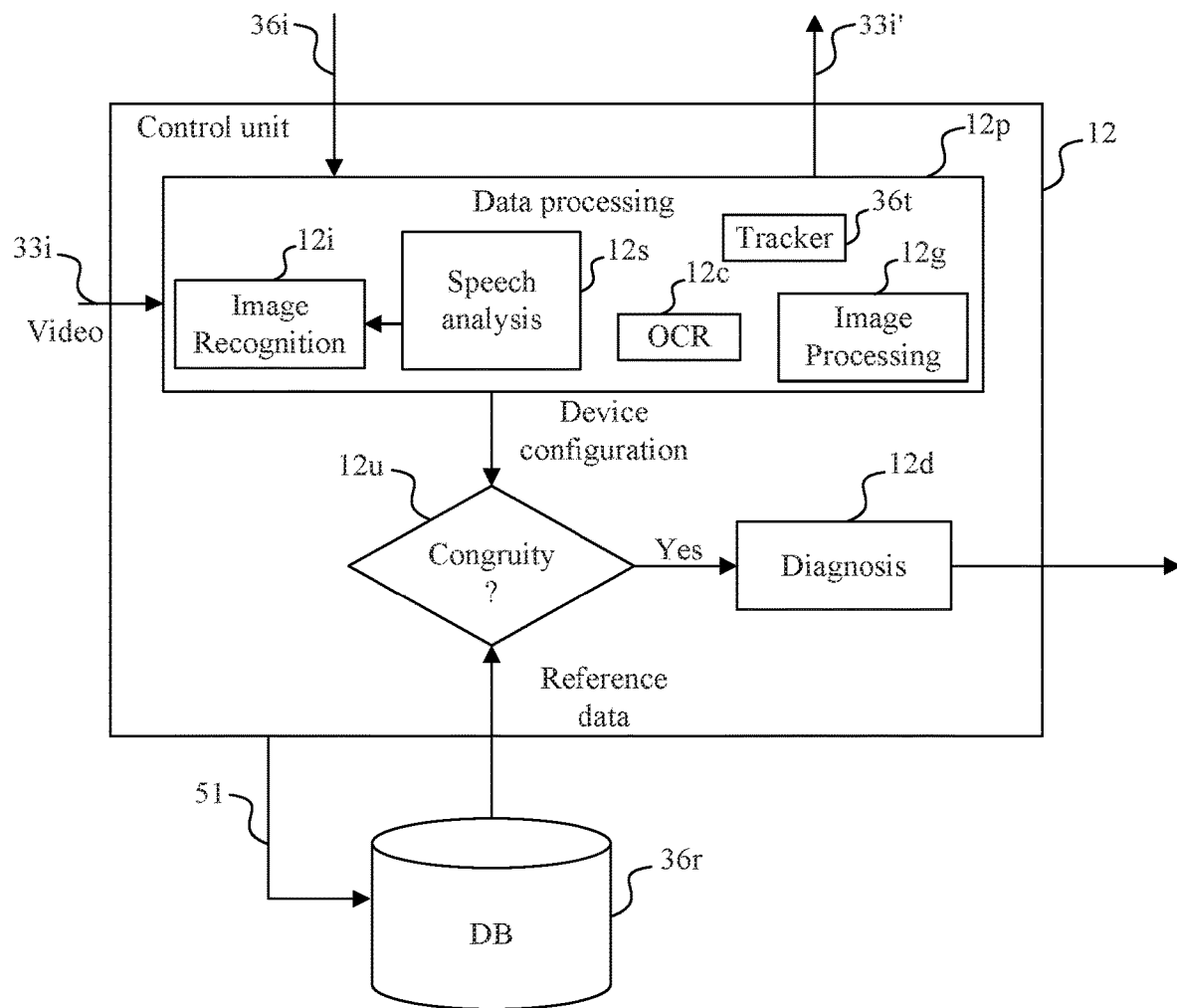
FIG. 3 is a functional block diagram schematically illustrating components of a control unit of a support center.

FIG. 3 is a functional block diagram illustrating components of the control unit 12 depicted in FIG. 1B. A processing utility 12*p* is used to process image data 33*i* received from user mobile device 31, identify issues/defects related to the captured object 33*e*, and generate annotated/augmented image data 33*i*'. Processing utility 12*p* comprises a speech analysis module 12*s* configured and operable to process the auditory signals received from the user and identify keywords indicative of the problematic/defective object, its elements and/or the nature of the problems experienced by the user. Processing utility 12*p* further comprises an image recognition module 12*i* configured and operable to process image data 33*i* from the user's mobile device and detect objects/elements related to the problem to be resolved.

Image recognition module 12*i* may scan the image data for certain objects/functional elements using keywords identified by the speech analysis module, and/or keywords 36*i* selected by the agent. In some embodiments, an optical character recognition (OCR) module 12*c* is used to identify letters/symbols within image data 33*i*, which can be used to guide the speech analysis module 12*s* and/or the image recognition module 12*i*.

Control unit 12 is configured and operable to use image recognition module 12*i* to identify an object/functional element's set up/configuration and detect potential problems or defects therein. Database 36*r* can be used to store a plurality of erroneous setups/configurations (also referred to herein as reference data) to be compared by a comparison module 12*u* of control unit 12. Whenever the comparison module 12*u* determines that newly acquired image data 33*i* contains the same objects, issues or defects as the reference data, control unit 12 generates a diagnosis 12*d* identifying the erroneous setup/configuration identified in the image data 33*i*.

Processing utility 12*p* may further include an image processing module 12*g*. Image processing module 12*g* is configured to superimpose annotations or markers onto the image data 33*i* based on keywords 36*i*, and generate annotated/augmented image data 33*i*' for conveying to the remote user. Control unit video tracking module (tracker) 36*t* ensures that the annotations/markers superimposed onto the image data remain anchored to a desired object or functional element while the image sensor and/or object move.

Whenever a support session conducted by TSC 36 successfully resolves a problem encountered by a remote user 33, control unit 12 generates a new database record 51 including data related to the user's problem and the TSC's solution. The new database record is stored in the database 36*r* for use in future support sessions conducted by the TSC. In some embodiments, one or more databases 36*r* are used to store the reference data and the records 51.

Figure 4:
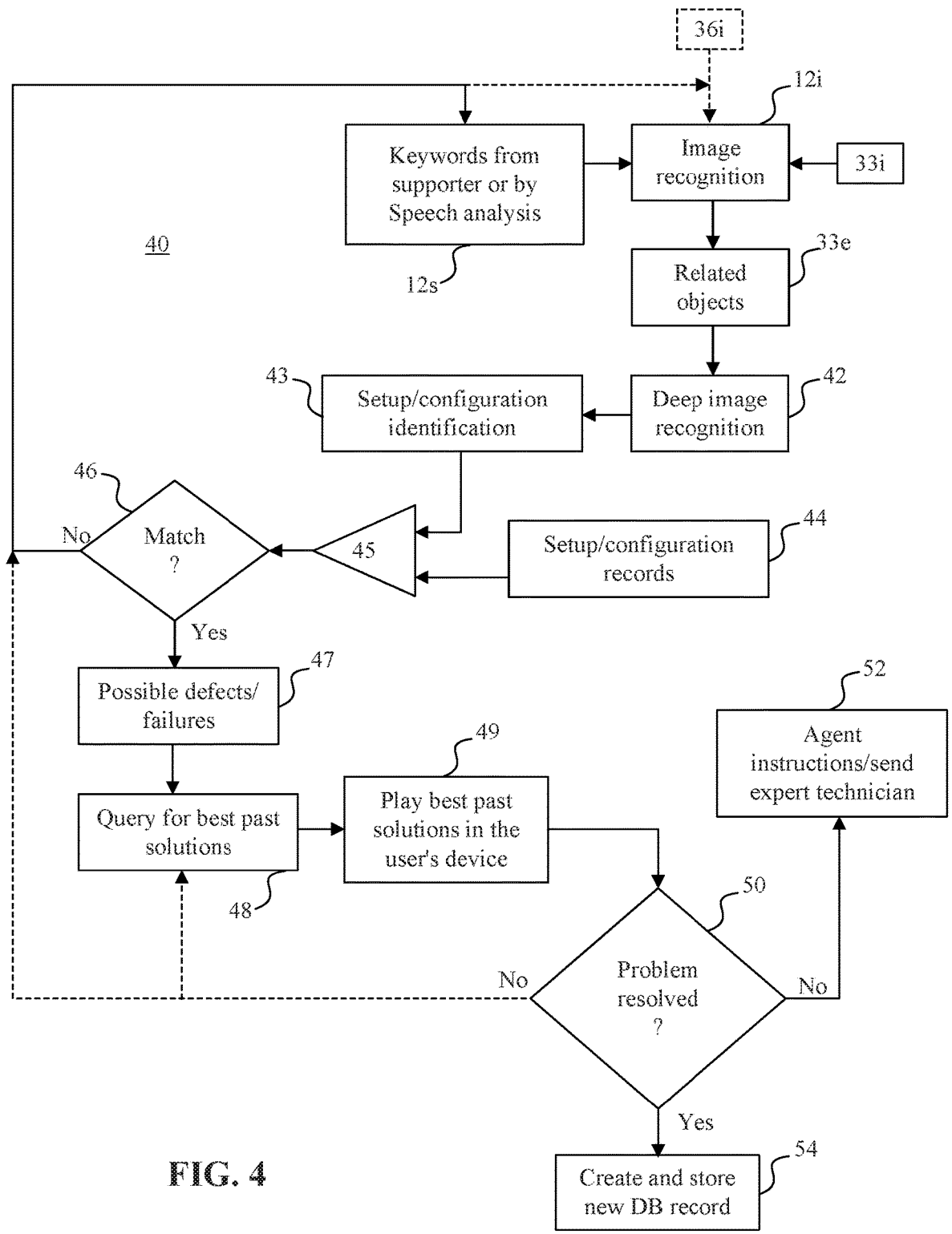
FIG. 4 is a flowchart illustrating an automated problem/defect detection process employing deep learning, in accordance with some embodiments.

FIG. 4 is a flowchart illustrating an automated problem/defect detection process 40 employing deep learning, in accordance with some embodiments. Image data 33*i* received from image sensor 31*c* of the user's mobile device 31 is processed by the image recognition module 12*i* to identify objects/elements related to the user's problem. As discussed above with respect to FIG. 3, image recognition module 12*i* may receive keywords 36*i* from the agent 36*p* and/or the control unit 12 to look for objects related to the user's problem. Alternatively, the speech analysis module 12*s* may be used to process the auditory signals obtained from the user 33 to identify keywords uttered by the user, and/or the agent, during the session 20. Keywords deduced from the auditory signals may then be used to guide the image recognition module 12*i* in identifying in the image data 33*i* objects/elements related to the problem to be solved. Additionally, or alternatively, the keywords may be typed by the agent during the support session.

Once object(s) 33*e* are identified as relevant, the image data undergoes deep image recognition 42 to identify the object's setup/configuration 43. A comparison step 45 is then used to compare the identified setup/configuration 43 to setup/configuration records 44 stored in database 36*r* of TSC 36. Based on the comparison results, the process proceeds to step 46, wherein a determination is made as to whether the assessed and recorded setups/configurations match.

If the setups/configurations do not match, the auditory and/or image data are reprocessed, to identify new objects/elements 33*e*. Any new auditory and/or image data obtained during the session 20 may also be processed, at which point all auditory/image data are processed to identify potential setup/configuration problems/defects. If a match is detected at step 46, possible problems/defects are determined accordingly in step 47. Comparing new problems against a database of potentially related problems allows for precise problem identification. Once problems/defects are determined, database 36*r* is queried in step 48 for the best past solution as discussed above with respect to FIG. 2. After determining the best past solution, it is presented to the user via a display in the mobile device in step 49. The best past solution may include an annotated image, a video showing how to achieve the best problem solution (with or without AR markings), text and/or audible instructions, and is presented to the user via the display of the mobile device 31.

Although generally configured to match an identified setup/configuration 43 with known, defective/problematic configurations in the database, the comparison conducted in step 45 may also be configured to match the identified setup/configuration 43 with non-problematic/non-defective setup/configurations. If the identified configuration 43 is determined to be correct, the image data and/or auditory signals undergoes further processing using speech analysis module 12*s* and/or image recognition module 12*i*. If there is no match between the setups/configurations, the items/elements causing the mismatch are analyzed to determine potential problems/defects in step 47.

If it is determined in step 50 that the best past solution obtained in steps 48-49 resolved the user's problem, a new database record 51 is constructed in step 54, and then stored in the database of the system for use in future trouble shooting sessions. The new database record may include one or more annotated images, a video showing how to fix the problem (with or without AR markers), text and/or audible instructions. If the best past solution is unsuccessful, other high-ranking solutions are obtained from the database, and presented in attempt to resolve the problem. Steps 48 to 50 may be repeated for each solution until a successful solution is found. Alternatively, or concurrently, speech analysis 12*s*, image recognition 12*i*, and steps 41 to 46 can be carried out to determine alternative problems/defects in the object 33*e*. If the problem is not resolved using a predefined number of database solutions, agent 36p may provide supplemental instructions or send a professional expert to the user 33 in step 52.

Through repetition, the problem/defect detection process 40, image data analytics, and algorithms disclosed herein establish a self-service mechanism in which the computer vision tools are used to analyze objects/elements in image data 33i and identify problematic/defective setups/configurations. This automation allows TSC 36 to diagnose objects 33e in real-time and produce expedient solutions. In one non-limiting example, techniques and processing system disclosed herein are capable of identifying disconnected cable(s), cable(s) that are erroneously connected to the wrong port/sockets, errors indicated by certain LEDs, and/or error messages.

In some embodiments, once the problem/defect detection process 40 identifies an object's problems/defects, tracker 36t automatically tracks the relevant object as discussed above with respect to FIG. 1B. Tracking facilitates problem/defect identification by allowing the agent to anchor annotations/markers to the object. This is especially useful where the user is technically unskilled. This automated problems/defects identification may be provided in instead of, or in addition to agent support.

The database generation and sorting process disclosed herein may be used in each support session 20 to improve the system's performance and facilitate customer service. Optionally, a machine learning process (e.g., employing any suitable state of the art machine learning algorithm having machine vision and deep learning capabilities) may be used to troubleshoot the technical support sessions. In one non-limiting example, the machine learning process logs and analyzes the users' interactions with the system during the support sessions to identify common users' errors. In this way, a dynamic database is constructed and problem solving sessions are optimized.

Figure 5A:
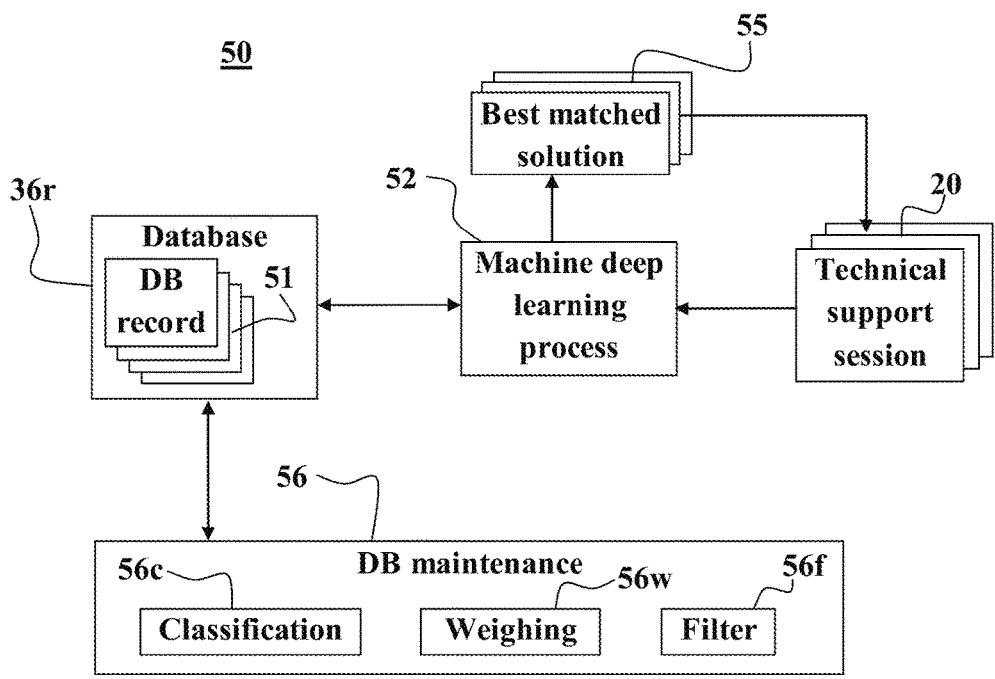
FIG. 5A is a block diagram illustrating a technical support system in accordance with some embodiments.

FIG. 5A is a block diagram illustrating a technical support system 50 in accordance with some embodiments. Support system 50 maintains and utilizes database 36r to resolve user problems. Support system 50 uses a machine deep learning tool 52 to process and analyze image and auditory data received from a plurality of support sessions 20 in real time. Machine deep learning tool 52 classifies each of the live support sessions 20 in a specific problem group (e.g., LAN connectivity, wireless connectivity, bandwidth, data communication rates, etc.), and identifies keywords and/or objects/elements mentioned/acquired during the session.

In some embodiments, the machine deep learning tool 52 is used to perform high-resolution, in depth, image recognition processes to identify the setup/configuration of object(s) 33e, as they appear in the image data. Identifying the setups/configurations allows the machine deep learning tool to accurately classify each support session in correct problem group. As will be described in detail below, the machine deep learning tool 52 may be used to find best matching solutions 55. In this way, machine deep learning tool 52 can be used to provide the system 50 a layer of automation, thereby allowing it to solve the user's problem without agent intervention.

Optionally, machine deep learning tool 52 may be configured and operable to carry out computer vision and video analysis algorithms for analyzing the image data and autonomously detecting problematic/defective objects therein. Machine deep learning tool 52, and/or processing utility 12p may then use the detected problems/defects to determine which past solutions from the database 36r may be used by agent 36p to resolve an ongoing user problem.

In some embodiments, machine deep learning tool 52 is further configured and operable to process and analyze data records 51 relating to previously conducted support, classify the database records according to the type of problem dealt with in each database record 51, identify keywords and/or objects/elements mentioned/acquired during the support session, and rank/weigh each database record 51 according to the number of times it was successfully used to resolve a problem of a particular type/classification.

Figure 5B:
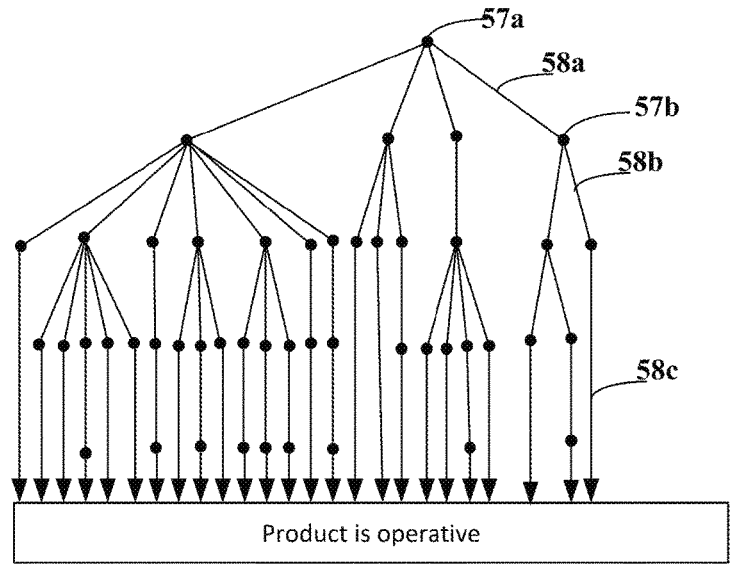
FIG. 5B illustrates a decision tree used by the support system of FIG. 5A in accordance with some embodiments.

FIG. 5B illustrates a decision tree used by support system 50 for determining the sequential instructions required to remedy the inoperability of an appliance. The input for the decision tree may be data derived from image data captured by image sensor 31c. For example, the image data may depict a current state of the inoperative product. The nodes in FIG. 5B represent operative states of the inoperative product and the lines represent the actions or the steps the user needs to complete to render the inoperative product operative.

At node 57a, support system 50 may identify the inoperative product (e.g., a router) using, for example, the router's model number. In step 58a the instruction may be to connect different cables of the router in a certain order. At node 57b, support system 50 may use additional image data to determine whether indicator lights of the router are red or green. If the indicator light is green, support system 50 may instruct the user to preform action steps 58b and 58c. If the indicator light is red, or otherwise not green, the support system 50 may instruct the user to perform other actions. Each line (i.e. action) may be associated with a weight representing the probability that the action will resolve the product's inoperability. Support system 50 may select a next sequential action based on the associated weight as will be discussed in further detail below. A person skilled in the art will recognize that the above example is simplified and that the actual process of remedy the inoperability of a product may involve substantially more steps.

Figure 5C:
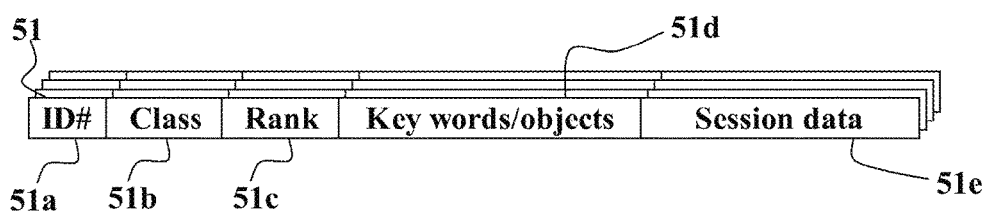
FIG. 5C is a schematic illustration of a database record in accordance with some embodiments.

FIG. 5C schematically illustrates a database record 51 in accordance with some embodiments. In some embodiments, the database record 51 may include an identifier field 51a which describes the object 33e using, e.g., the object's serial or model number, a classification field 51b describing the type of problem/defect associated with the object, a ranking field 51c comprising a list of solutions, a keywords/objects field 51d cataloguing the keywords and objects mentioned/acquired during the support session, and a session data field 51e, which includes image and auditory data related to the support session and used to resolve the user's problem.

It is to be appreciated that the systems and methods disclosed herein facilitate problem identification and resolution by substantially automating the process. Such automation reduces the agent training time and expense.

In some embodiments, machine deep leaning tool 52 is configured to scan database records 51 during each support session to match the problem presented in an ongoing session with a best matching solution 55. Machine deep leaning tool 52 identifies a set of database records 51 whose classification field 51b matches the classification field 51b of an ongoing support session 20. The machine deep leaning tool 52 then compares the keywords/objects field 51d of each database records 51 in classification field 51b to the keywords/objects identified/acquired in the ongoing support session 20, and selects a sub-set of best matching solutions 55. Thereafter, machine deep leaning tool 52 compares ranking fields 51c of the sub-set of best matching solutions 55 and selects at least one high-ranking solution 55 therefrom. The solution is then used by system 50 to resolve the problem presented in the ongoing support session 20.

In some embodiments, system 50 comprises a maintenance tool 56 configured and operable to operate in the background and continuously, periodically or intermittently, check the validity of each one of records 51 of database 36r. Maintenance tool 56 can determine whether certain types of database records 51 are no longer relevant (e.g., whether the record relates to obsolete/outdated technologies) and thus can be discarded. Maintenance tool 56 may also discard database records that are infrequently used, or which had little (or no) success in resolving user's problems.

In some embodiments maintenance tool 56 comprises a classification module configured and operable to classify the database records, and/or verify the classification determined for each record by machine deep learning tool 52. As illustrated in FIG. 5A, a weighing tool 56w can be used to weigh and/or ranks each database record 51. The weight/rank may be assigned to designate the relevance of a record 51 to a certain classification group, such that each record may have a set of weights indicating a measure of relevance of the record to each one of the problems classifications/categories dealt with by the system. A rank may be assigned to a record to designate a score/percentage indicative of the number of instances it was successfully used to resolve problems in support sessions conducted by the system 50.

As illustrated in FIG. 5A, system 50 may further comprise a filtering module 56f. Maintenance tool 56 may use filtering module 56f to determine whether to discard one or more database records 51. The filtering module 56f is configured and operable to validate the database records and decide accordingly which of the database records 51 provide valuable solutions and should be maintained. Optionally, the filtering module 56f may be configured and operable to maintain only database records having a sufficiently high rank, e.g., above some predefined threshold, and discard all other records 51. Alternatively, the filtering module 56f is configured and operable to examine the ranks of all database records 51 belonging to a certain classification group, maintain some predefined number of database records having the highest ranks within each classification group, and discard all other records 51 belonging to the classification group. For example, five (or more, or less) records having the highest ranks/scores may be kept within each classification group.

As explained hereinabove, the techniques disclosed herein allow for the gradual implementation of full self-service, wherein system 50 autonomously analyzes auditory/image data from the user's mobile device 31 and automatically determines the potential issues/defects causing the user's problem(s). System 50 is capable of automatically and remotely guiding the user to fix the problem, while monitoring the user's actions in real time.

System 50 can be thus configured to concurrently conduct a plurality of support sessions 20, without any human intervention, using combined speech and image/video recognition techniques, to extract the proper and relevant keywords from auditory signals and/or image data obtained from user 33 that describe the experienced problem, and to determine the setup/configuration of the user's object.

The combinations of the speech and image/video recognition techniques disclosed herein enable system 50 to assess the nature of the user's problem, and to generate a set of best working solutions from the system's database of relevant past working solutions. By using deep machine learning tools, the system gains enhanced problem solving capabilities, thereby guaranteeing that common user problems will get the best solutions.

In some embodiments, database records may be stored on user mobile device 31. This is especially useful when mobile device connectivity is poor or non-existent, or connectivity is unnecessary. These database records 51 are relevant to one or more of the user's problematic/defective objects/equipment. In such embodiments user mobile device 31 can be configured to automatically identify the object/equipment that needs to be serviced, using any of the techniques described herein, or alternatively let the user select the item/equipment that needs to be serviced from a list. Based on the user's selection, and/or automatic identification, user 33 will be provided with the best working solutions as provided in the maintained database records e.g., by playing/showing the recorded augmented reality based instructions. This way, different and specific self-service support modes can be implemented in a user's device, according to the specific items/equipment of the user.

If the user's device has temporary connectivity over a communication network (e.g., to the cloud), the best working solution can be downloaded to the user's device using the same user selection, and/or automatic identification procedures, either manually or by pattern recognition techniques.

One inventive aspect of the disclosure provides an image processing system for visually augmenting a real-time video stream. The image processing system comprises at least one processor configured to receive the real-time video stream captured by an image sensor, the real-time video stream including images of at least one cable and an electronic appliance. The at least one processor may analyze the real-time video stream to identify a plurality of ports in the electronic appliance. The at least one processor may also analyze the real-time video stream to identify a specific cable for association with a specific port of the plurality of ports; causing a display of a movable augmented indicator together with the live video stream, wherein the movable augmented indicator is configured to guide a user's connection of the specific cable to the specific port. The at least one processor may further monitor in the real-time video stream changing locations of the specific port as the image sensor moves relative to the electronic appliance. In some cases, the at least one processor may adjust positions of the movable augmented indicator to account for the changing locations of the specific port in the real-time video stream.

In accordance with some embodiments, the system is configured to display a movable augmented indicator together with the real-time (live) video stream to account for varying distances between two objects.

Figure 6A:
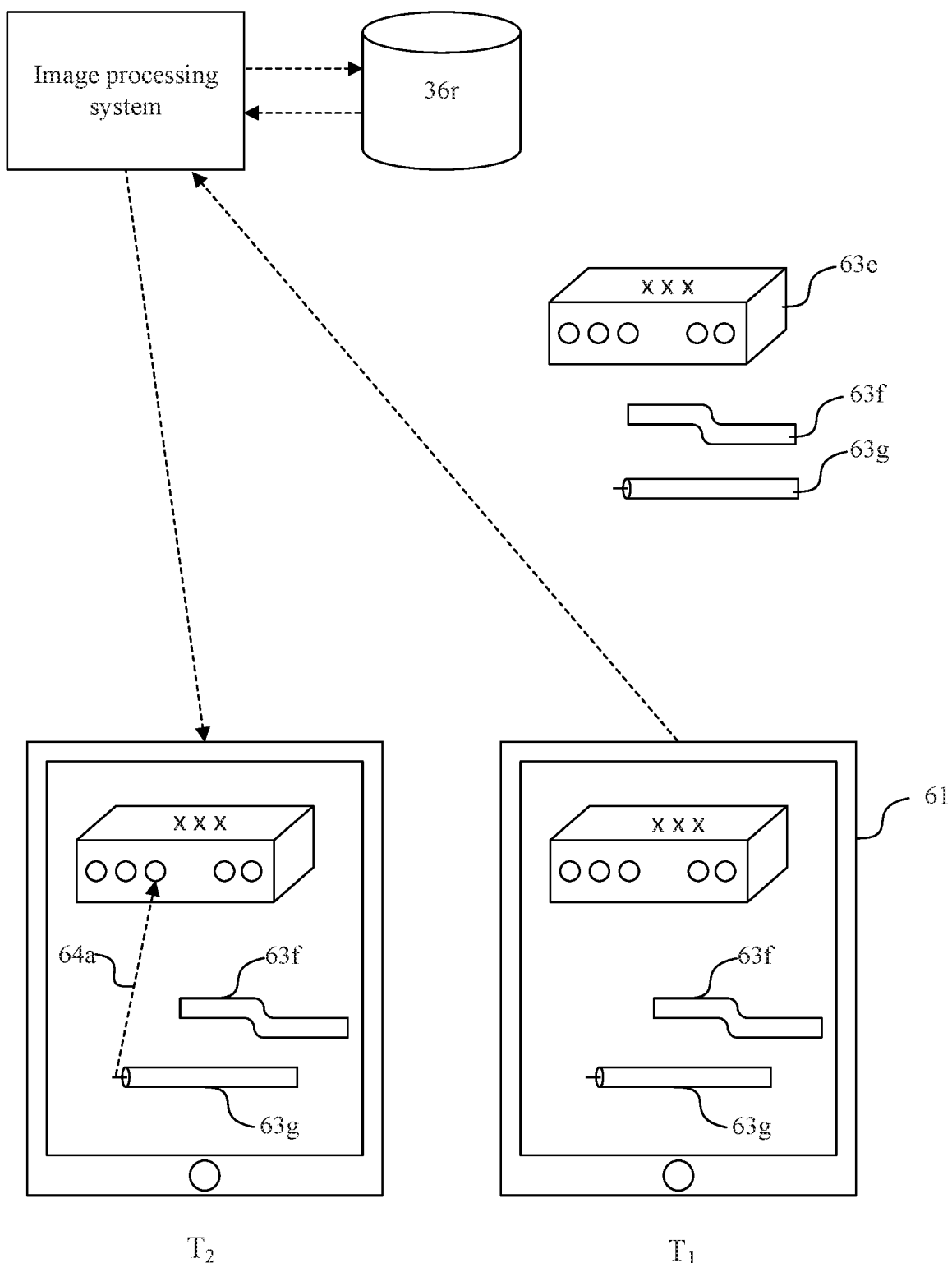
FIGS. 6A-6C schematically illustrate an application of an image processing system in accordance with some embodiments of the disclosure.
Figure 6B:
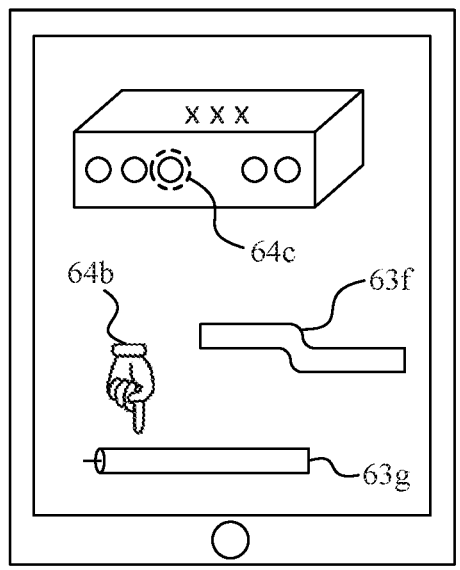
Figure 6C:
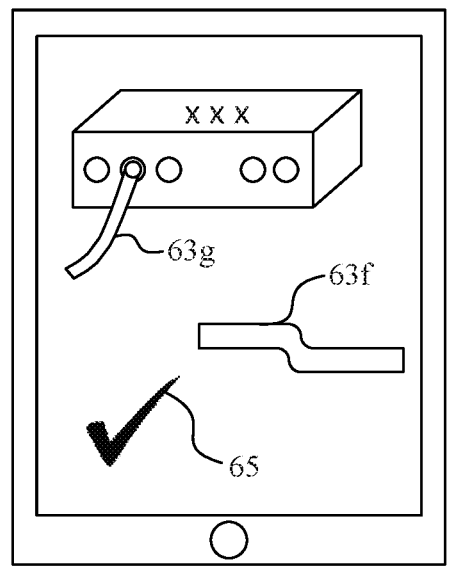

FIGS. 6A-6C schematically illustrate an application of image processing system 60 for visually augmenting a real-time video stream. During a first phase (T1) user 33 positions a mobile device 61 such that object 63e and functional elements 63f, 63g and 63h are within the field of view of the mobile device's image sensor. In some embodiments, object 63e may be an electrical appliance and functional elements 63f-h may be cables for connecting to the electrical appliance and ports for receiving the cables.

Mobile device 61 may transmit, and image processing system 60 may receive, image data 33i in the form of a real-time video stream. Once received, system 60 may analyze the video stream to identify the electrical appliance and functional elements thereof, using the database 36r and data processing methods discussed and described above with respect to FIGS. 3 and 5. After each element is identified, a moveable augmented indicator may be superimposed onto the video stream during a second phase (T2). As discussed above, augmented indicator 64 may provide instructive guidance to user 33 to facilitate repair and/or assembly of the electrical appliance. The indicator may appear on mobile device 61 during the live video stream and may appear in any of a variety of shapes or symbols to facilitate repair/assembly. FIG. 6A illustrates an arrow-shaped augmented indicator 64a directing the user to insert cable 63g into a specific port. FIG. 6b illustrates an alternative embodiment in which a first, finger-shaped augmented indicator 64b directs the user's attention to cable 63g and a second, circular augmented indicator 64c circumscribes the specific port. Optionally, a confirmation notification may be superimposed on the live video feed once a repair/assembly step is successfully completed. FIG. 6C illustrates a confirmation notification 65 in the shape of a check; it is to be understood however, that confirmation may be provided using any of a variety of symbols, messages or sounds. For example, confirmation 65 may include the message "OK", a green circle, an audible chime etc. Alternatively, the moveable augmented indicator may change (e.g., color or disappear) to indicate completion.

In one embodiment, image processing system 60 may utilize the tracker 36t, discussed and described above, to adjust a position of indicator 64 when the image sensor, appliance or functional elements move. For example, arrow 64a may become shorter or shift position, or circle 64c may become smaller as the user inserts the cable into the port. Image recognition and processing modules 12i, 12g of the processor may recognize functional elements when they are being manipulated. In this way, the processing system is able to identify and track the appliance and functional elements while they are being held by the user.

Figure 7:
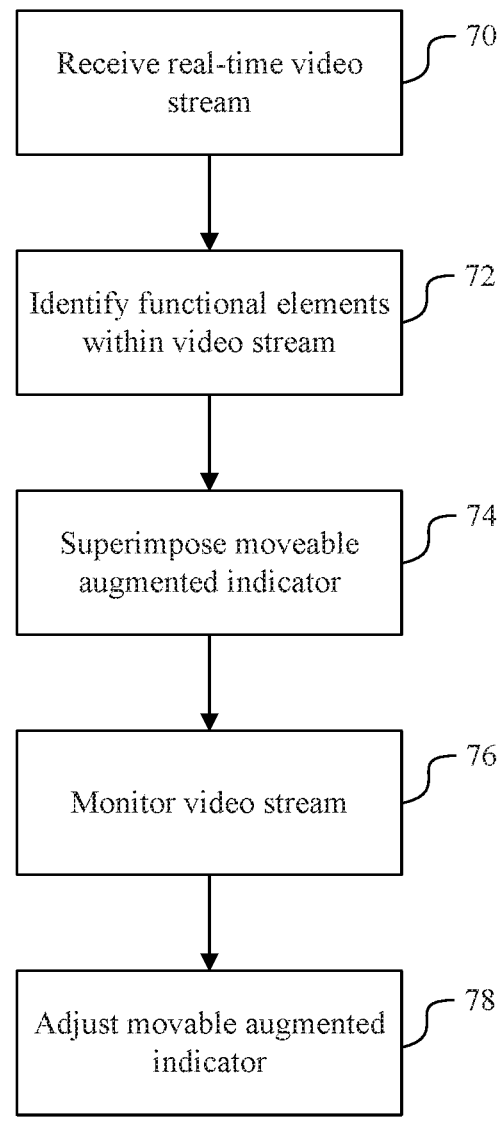
FIG. 7 is a flow chart illustrating a method for visually augmenting a real-time video stream captured by an image sensor.

FIG. 7 is a flow chart illustrating a method for visually augmenting a real-time video stream captured by an image sensor using image processing system 60. The method starts when image processing system 60 receives real-time video stream 33i captured by an image sensor on the user's mobile device (step 70). The real-time video stream 33i may include images of at least one object, e.g., electronic appliance 63e and one or more functional elements. In some cases, system 60 may visually (e.g. via textual command) or audibly (e.g. via voice command) direct the user to place the object and one or more functional elements within the sensor's field of view, or otherwise refocus the image sensor.

Once within the field of view, the real time video stream 33i may be analyzed using the data processing techniques described above to identify one or more functional elements, e.g., a plurality of ports in the electronic appliance and a specific cable for association with a specific port of the plurality of ports (step 72). The received video stream may be captured by a wearable image sensor or mobile device. In some embodiments, the at least one processor may be configured to analyze the video stream to identify a user's hand and one or more fingers, and/or an additional cable associated with an additional port of the plurality of ports when the specific cable is held by the user's hand or one or more fingers.

After identifying the relevant elements, the system 60 may cause a movable augmented indicator to display on the live video stream, the movable augmented indicator may be configured to guide the user's connection of the specific cable to the specific port (step 74). In some embodiments, the augmented indicator may include a boundary at least partially circumscribing the specific port. The boundary may form at least a portion of a circle, square or other polygon. Alternatively, the augmented indicator may be an arrow, bracket, finger or line. In some embodiments, the augmented indicator may change in appearance (e.g. transition from blinking to steady or arrow to check mark, or disappear) or color to alert the user that a step has been successfully completed. In other examples, the augmented indicator may change when the specific cable is successfully connected to the specific port The real-time video stream may be monitored throughout the course of the repair/assembly (step 76). In this way, the system may move, resize or otherwise adjust the augmented movable indicators to reflect the user's progress (step 78). In one embodiment, the at least one processor may be further configured to adjust the positions of the movable augmented indicator by changing a pointing direction of the arrow to coincide with movement of the specific port in the live video stream. For example, system 60 may adjust the movable augmented indicator to account for the changing locations of the specific port in the real-time video stream. Consistent with one embodiment, after the specific cable is connected to the specific port, the video stream may be analyzed to confirm that the specific cable was properly connected to the specific port. The video stream may be analyzed, for example, by assessing a status light on the electronic appliance.

In some embodiments, the method further comprises retrieving from information about the electronic appliance from a database. Where, for example, the plurality of ports in the electronic appliance share a similar visual appearance, a specific port of the plurality of ports may be identified based on the retrieved information. Specifically, the database records may be stored on a remote server or on the user's mobile device. This may be useful when mobile device connectivity is poor or non-existent, or connectivity is unnecessary. If the user's device has temporary connectivity over a communication network (e.g., to the cloud), the best working solution can be downloaded to the user's device using the same user selection, and/or automatic identification procedures, either manually or by pattern recognition techniques. Methods for visually augmenting the real-time video stream may be stored on various non-transitory computer readable media (CRM). The instructions contained on the CRM may be executed by a processor to cause the processor to perform the method discussed above.

In accordance with some embodiments, the method may further include causing auditory feedback to be provided in conjunction with the moveable augmented indicator to guide the user's connection of the specific cable to the specific port. Optionally, the feedback may be adjusted to account for the changing locations of the specific port in the real-time video stream. The auditory feedback may include discrete "beeps" or "clicks", wherein a frequency of auditory feedback correlates to the user's proximity to the specific port. Additionally, or alternatively, the auditory feedback may include a chime or other distinct sound when the specific cable is properly placed in the specific port.

Although reference is made to an electrical appliance and cable, it is to be understood that the system and methods disclosed herein may be used with other objects. Where two objects are concerned, for example, the two objects include may two distinct components of an electrical appliance (e.g. cable and port) or a user's hand and a component of the electrical appliance (e.g. button, switch, cable, port, trigger, indicator light etc.) The augmented indicator may direct the user to a particular component of an electrical appliance (e.g. button, switch, cable, port, trigger etc.) to guide manipulation or use thereof. The two objects may also include two distinct components of furniture (e.g. rail and drawer), a user's hand and a component of the furniture (e.g. leg, shelf, rail, drawer etc.), or a user's hand and a tool (e.g.

screw driver, wrench, bolt etc.). The augmented indicator may direct the user to a particular component of the furniture (e.g. leg, shelf, rail, drawer etc.) to guide manipulation or use thereof.

In accordance with some embodiments, the video stream is captured by a wearable image sensor or mobile device, e.g. smart glasses, mobile phone, tablet, laptop, etc.

In accordance with some embodiments, information about the electronic device (e.g. port and cable orientation and configuration) may be stored in a cloud or other database.

In accordance with some embodiments, the moveable augmented indicator includes an arrow, finger, line or boundary (e.g. a portion of a circle, square or other polygon). The indicator may change in appearance (e.g. transition from blinking to steady or arrow to check mark) or color to alert the user that a step has been successfully completed.

In accordance with some embodiments, auditory feedback is provided in conjunction with the moveable augmented indicator to guide the user to a desired component of the electrical appliance, In accordance with some embodiments the auditory feedback may include discrete "beeps" or "clicks", wherein a frequency of auditory feedback correlates to the user's proximity to the desired component. Additionally, or alternatively, the auditory feedback may include a chime or other distinct sound when a component is properly placed and/or when an entire task is completed. Alternatively, the auditory feedback may include words.

In some embodiments, processing system 60 is configured to suspend further instruction when the electrical appliance or functional element are not within the image sensor's field of view. The processor may be configured to notify the user, via the mobile device, when instructions have been suspended and/or when they have resumed. The processor may further be configured to notify the user, via the mobile device, of one or more pending instructions once instructions have been suspended.

FIGS. 8A-8D illustrate another application of image processing system 60, wherein the image processing system 60 employs artificial intelligence during technical support. The image processing system comprises at least one processor configured to: receive image data captured by an image sensor of a mobile device, the image data including images of an inoperative appliance in an environment of a user; perform image recognition on the image data to determine an identity of the inoperative appliance and a likely cause of inoperability; retrieve a plurality of sequential instructions to be provided for enabling a user to complete a plurality of sequential actions in order to remedy the inoperability; cause the mobile device to sequentially display the plurality of sequential instructions; detect that the inoperative appliance is outside a field of view of the image sensor, based on the image data and during execution of the sequential actions; suspend display of additional sequential instructions while the inoperative appliance is outside of the field of view; detect when the inoperative appliance returns to the field of view after suspending display; and resume display of the additional sequential instructions after the inoperative appliance is detected to return to the field of view.

Figure 8A:
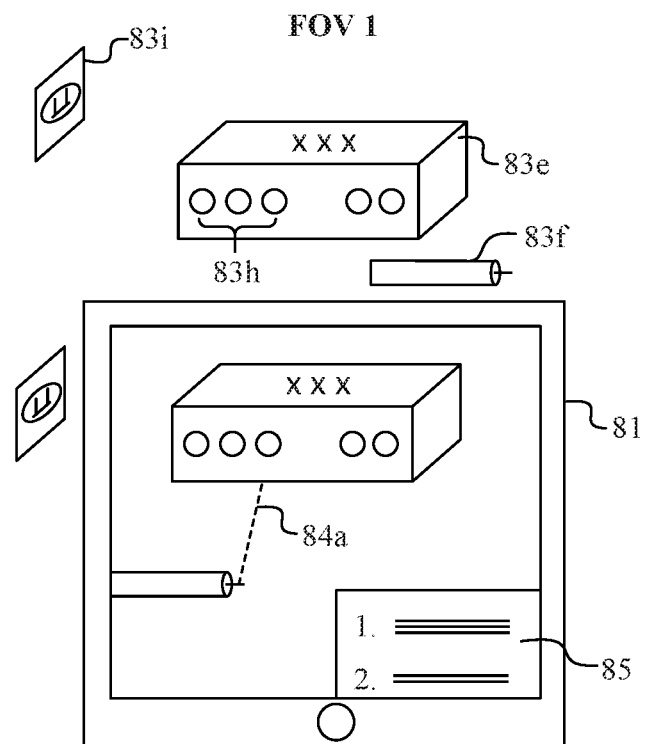
FIGS. 8A-D illustrate an application of the image processing system in accordance with embodiments of the disclosure.

As seen in FIG. 8A, once an appliance 83e and relevant functional elements 83f, 83h, and 83i are detected and identified in the live video stream, and a likely source of inoperability is assessed, a plurality of sequential instructions 85 for repairing/assembling the object are displayed on the mobile device. A likely source of error may be derived from database 36r as discussed above, or deduced from the operational state of the elements. For example, if the processor detects, using the data processing techniques described above, that the appliance is not connected to a power source, it may deduce that a lack of power is the cause of inoperability. Instructions 85 may be displayed one at a time, or multiple instructions may be displayed simultaneously. FIG. 8A illustrates yet another embodiment wherein at least two instructions and a moveable augmented indicator 84a are simultaneously displayed on a mobile device 81.

Figure 8B:
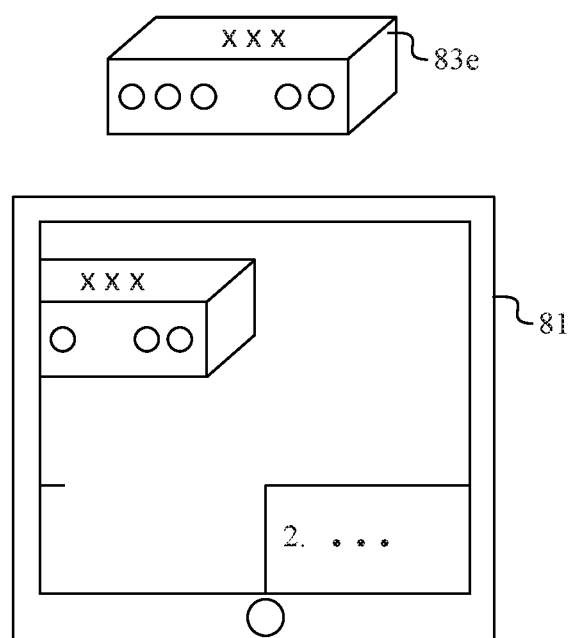

During repair/assembly, the user may purposefully or accidently move the appliance/functional element out of the field of view (see FIG. 8B). Optionally, the image processing system 60 is configured to detect whether the inoperative appliance is outside a field of view of the image sensor by analyzing the image data in which the sequential actions are being conducted and determining that the appliance is missing from the image data. The processor may detect whether the inoperative appliance is outside the field of view of the image sensor by comparing current image data with data reflective of the inoperative appliance and determining that the inoperative appliance is not present in the current image data.

When the processor detects the move, it may suspend further instruction as illustrated in FIG. 8B and/or notify user 33 that the object/functional element is out of the field of view. In either case, the processor may instruct the user to refocus the image sensor so that the object/functional element return to the field of view. Notifications may be audible, coming through a speaker of the mobile device, or visual. Visual notification may include a verbal message displayed on the mobile device display, or a non-verbal cue, e.g. an arrow, directing the user to move the image sensor in a particular direction to recapture the object/functional element in the field of view. Alternatively, an image of pending instructions, and/or and image of the object/functional element prior to leaving the field of view, may be displayed on the mobile device. In some embodiments, the processor is configured to cause the mobile device to present information about at least one of the sequential instructions when the processor detects that the inoperative appliance is outside the field of view. The information may include, for example, details pertaining to pending instructions, an image of the inoperative appliance, and corresponding annotations before it left the field of view.

Figure 8C:
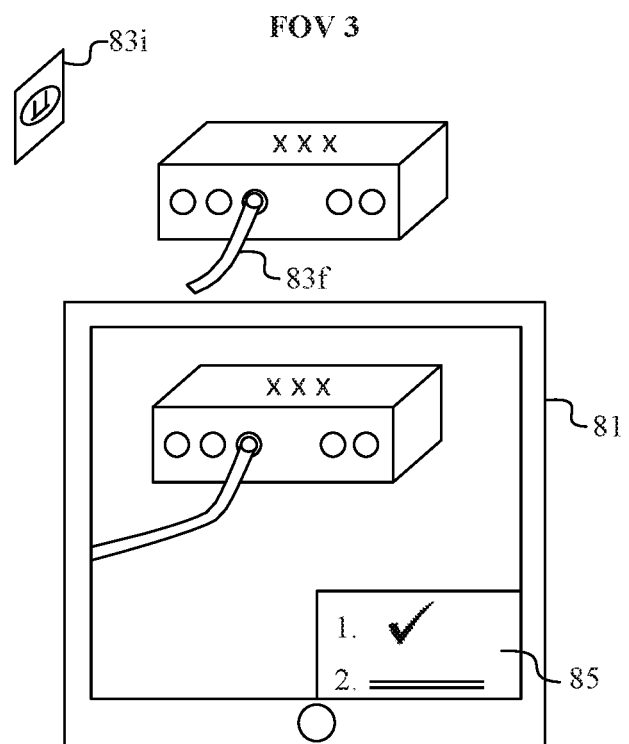
Figure 8D:
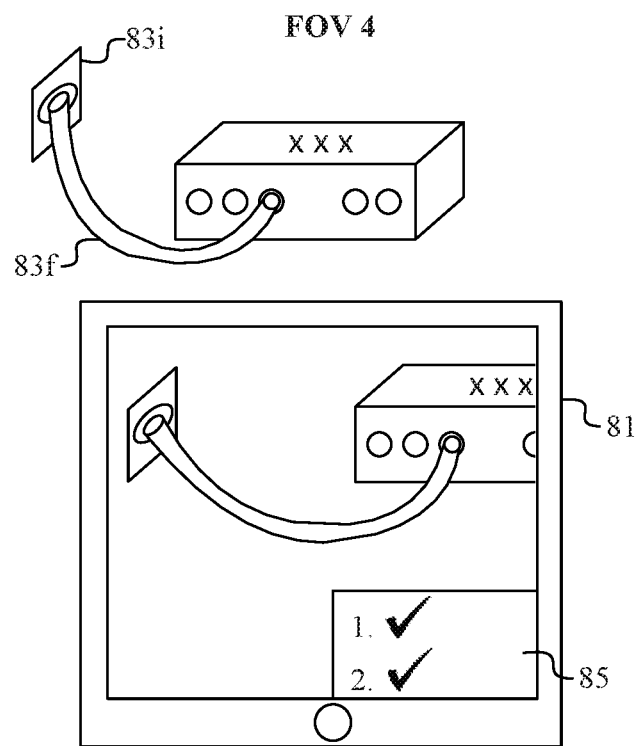

Once the object/functional element returns to the field of view, the processor resumes real-time instruction. Additional instructions may display as the user progresses. As illustrated in FIG. 8C, a confirmation notification may accompany the completed step. Confirmation may be audible or visual as described above. FIG. 8D illustrates a mobile device display after two steps have been completed. It is envisioned that confirmation notifications will accompany each completed step and that a final confirmation may be provided to signify that repair/assembly is complete. Although steps may be displayed sequentially, the user may override or speed up an instruction to advance to a later stage in the assembly/repair process. This option allows skilled users to save time.

Figure 9:
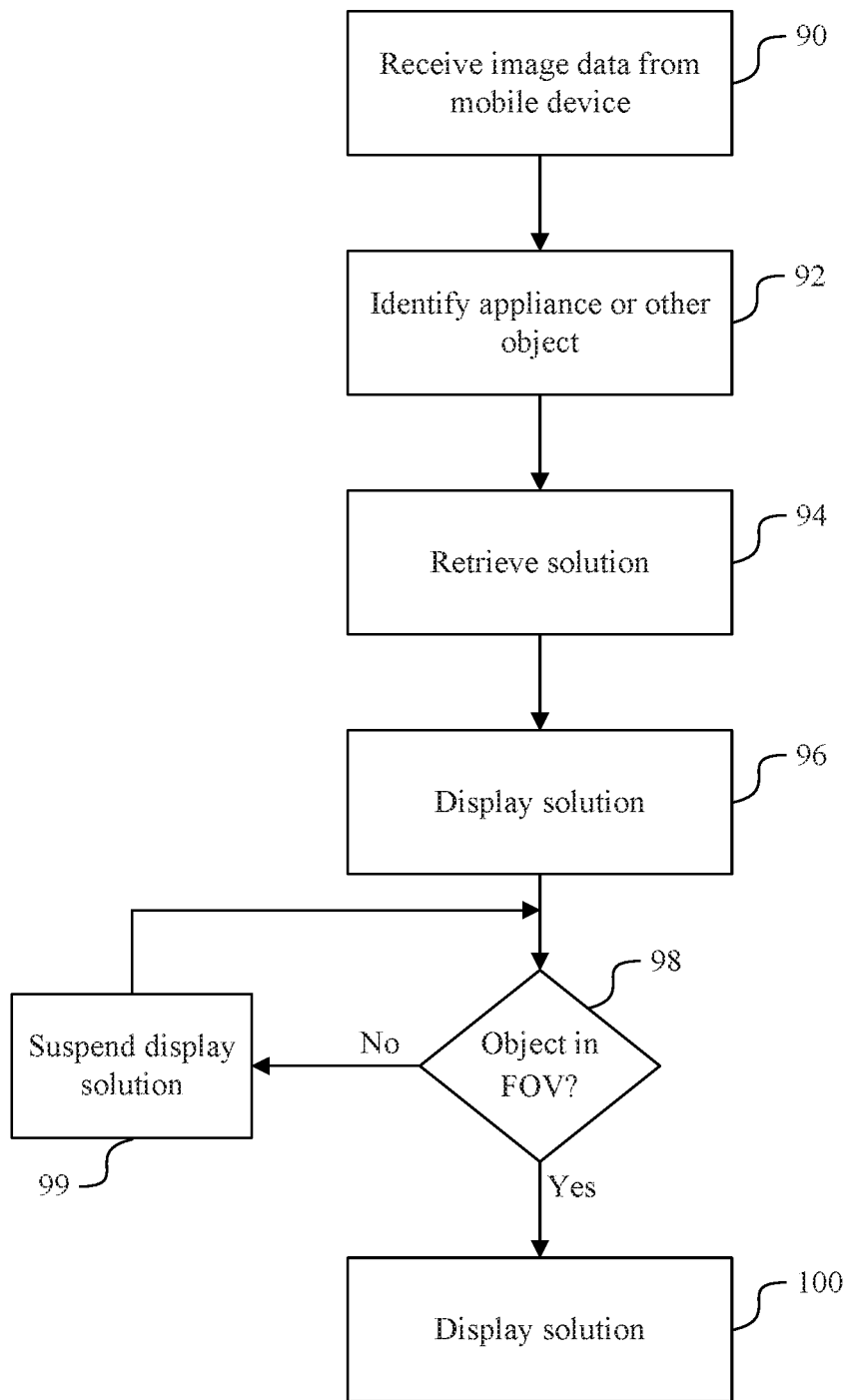
FIG. 9 is a flowchart illustrating a method for employing artificial intelligence during technical support.

FIG. 9 is a flow chart illustrating a method for employing A.I. during technical support.

Mobile device 81 transmits and image processing system 60 receives image data including images of inoperative appliance 83e and various functional elements related thereto (step 90). The processor may identify the appliance using the appliance model number or brand (illustrated as "XXX" in FIGS. 8A-8D). The image processing system 60 then performs image recognition on the image data to identify the appliance's likely source of inoperability (step 92). As discussed above with respect to FIG. 3, a processing utility 12p including image recognition, OCR, and image processing modules, is used to process the image data received from the user's mobile device, and identify issues/defects related to the captured object. Once the source of inoperability is identified, the processor retrieves at least one solution from database 36r (step 94) and causes the mobile device to display one or more sequential instructions relating to the solution (step 96). In some embodiments, displaying the plurality of sequential instructions for remedying the inoperability of the appliance includes displaying a movable augmented indicator together with the image data. The movable augmented indicator may be anchored to a specific functional element of the inoperative appliance using tracker 36t discussed above. In still other embodiments, audible instructions may accompany display of the sequential instructions and/or moveable augmented indicators.

During repair/assembly of the inoperative appliance, the processor continuously scans the image data to determine whether the appliance/related functional elements are within the image sensor's field of view (FOV) (step 98). The processor may determine that the appliance/functional element is no longer within the field of view by comparing a previous image of the appliance/functional element to a live image of the appliance/functional element.

If the processor determines that the appliance/functional element has left the field of view, the processor may suspend display of any pending instructions (including moveable augmented indicators) and/or instruct the user to refocus the image sensor so that the appliance/functional elements return to the field of view (step 99). The processor may notify the user via a visual or audible message. Such notifications may occur automatically or after a preset time.

For example, the processor may allot three minutes to a particular step and only notify the user that the appliance/functional element is out of the field of view once three minutes have passed. Such a configuration allows the user to set the mobile device aside and proceed with repair/assembly without receiving distracting notifications. In some embodiments, the processor will only notify the user if a functional element related to a particular step is outside the field of view. For example, if step three of a set of sequential instructions directs the user to insert cable "b" into port "z", and cable "c" or ports v-y are outside the field of view, the user will not receive a notification. If, however, step four requires the user to insert cable "c" into port "y", a notification will occur. The user may continue to get notifications until the relevant functional elements/appliance are within the field of view. Alternatively, the processor may continue to provide audible instructions even though the appliance/functional element is outside the field of view.

Once the relevant functional elements/appliance return to the field of view, the processor will resume display of the pending instructions (step 100). Methods for employing A.I. during a technical support session may be stored on various CRM. The instructions contained on the CRM may be executed by a processor to cause the processor to perform the method discussed above.

To ensure successful repair/assembly and customer satisfaction, image processor 60 may be further configured to notify the user when an assembly/repair error occurs. The processor may be configured to identify the product and the likely source of inoperability of the product using the product's model number, brand, or other labeling.

FIGS. 10A-10D illustrate a support session wherein the image processing system 60 is configured to provide automatic feedback. The image processing system employs artificial intelligence to assist a user during technical support. The image processing system comprises at least one processor configured to: receive real-time image data captured by an image sensor of a mobile device at a location of an inoperative product, the real-time image data including at least one image of the inoperative product; perform image recognition on the real-time image data to identify a likely source of inoperability of the product; cause the mobile device to display a plurality of sequential instructions for mitigating inoperability of the product; determine that an error was made while performing the particular instruction, based on additional real-time image data captured following the display of the particular one of the plurality of sequential instructions; cause the mobile device to display an error notification when the particular instruction is not complied with, the error notification being displayed before a subsequent instruction is displayed; determine that the particular instruction was subsequently complied with based on real-time image data captured following the notification; and cause the mobile device to display the subsequent instruction of the plurality of sequential instructions after the particular instruction is determined to have been complied with.

Figure 10A:
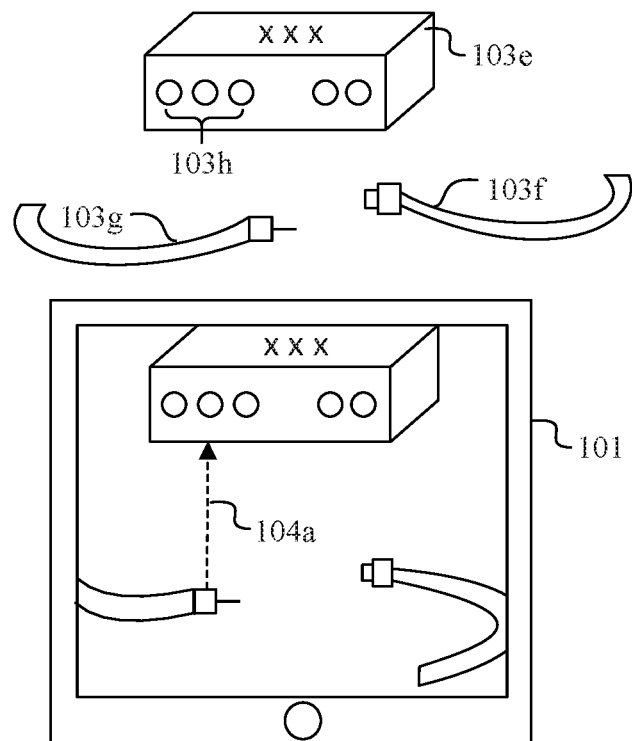
FIGS. 10A-10D illustrate an application of the image processing system in accordance with embodiments of the disclosure.
Figure 10B:
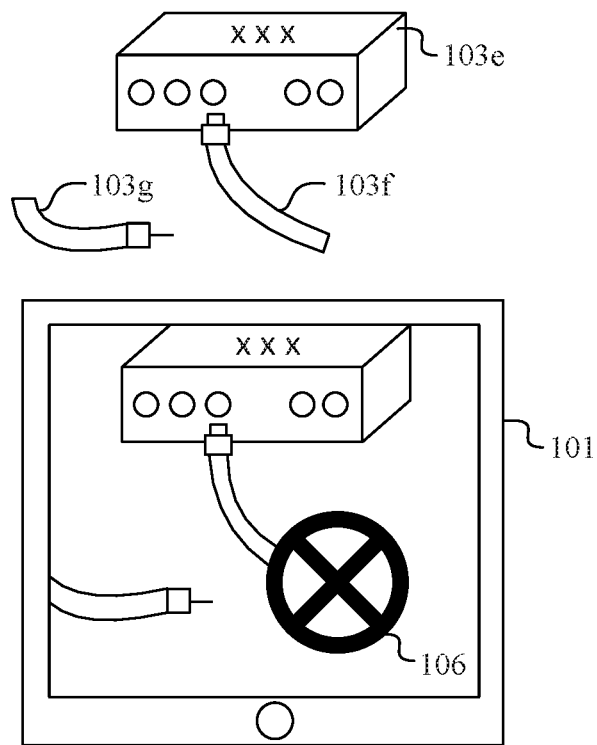
Figure 10C:
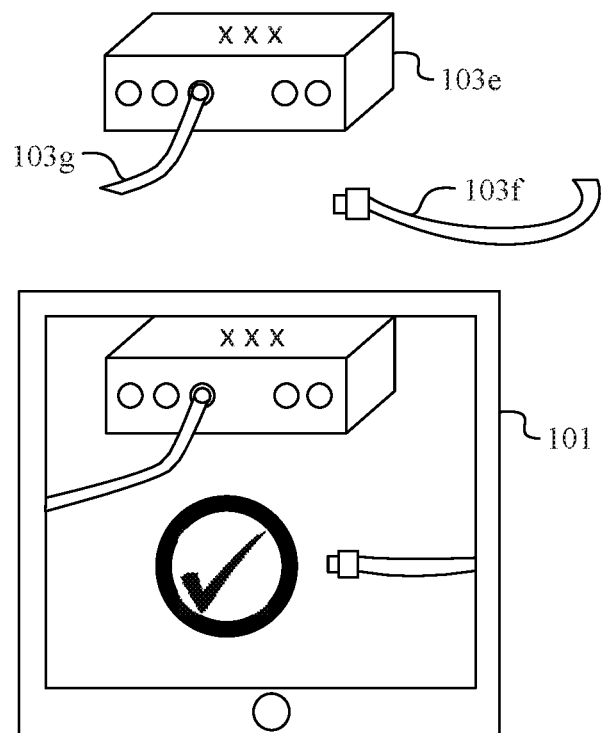
Figure 10D:
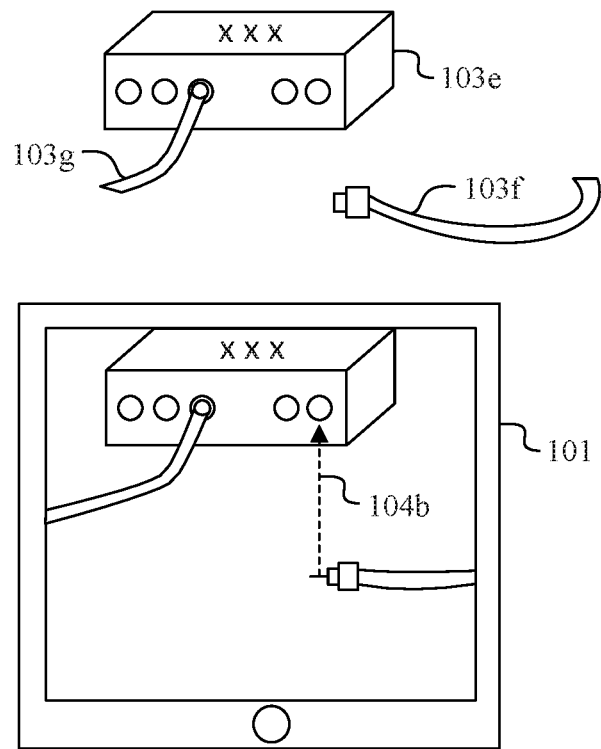

FIG. 10A illustrates an inoperative product 103e and relevant functional elements (e.g. ports and cables) 103f, 103g, and 103h. Once the appliance and elements are detected and identified in the live video stream, a likely source of error is assessed, and a set of sequential instructions are superimposed onto the live video stream. The product may be identified using the products model number, brand or other labeling (depicted herein as XXX). Instructions for mitigating the inoperability may be retrieved from database 36r, using the identified likely source of inoperability. The instructions may be in the form of moveable augmented indicators 104a, 104b as illustrated in FIGS. 10A and 10D and displayed on mobile device 101. Alternatively, the instructions may include a combination of moveable augmented indicators and written instructions as discussed above with respect to FIGS. 8A-E and 9. The plurality of sequential instructions may relate to assembling and/or repairing the inoperative product.

The augmented live feed illustrated in FIG. 10A instructs the user to insert a specific cable 103g into a specific port. The processor may be configured to determine, based on the real-time image data, that a user is about to make an error that is not in compliance with the particular instruction, and to cause the mobile device to warn the user of impending non-compliance. Accordingly, when the user attempts to insert the wrong cable into the specified port, an error notification 106 is promptly displayed. This error notification may be symbolic, as seen in FIG. 10B, or include a verbal message and/or audible message (e.g., buzzing). In some embodiments, the processor is further configured to cause the mobile device to present positive feedback after the particular instruction is determined to have been complied with. The "X" illustrated in FIG. 10B, for example, may be replaced by the check illustrated in FIG. 10C when the correct cable 103g is inserted into the specified port. Audible feedback, e.g., a chime may accompany the visual message. Once the error is corrected, a subsequent instruction (e.g., moveable augmented indicator 104b) may be displayed on the mobile device, as shown in FIG. 10D.

In certain situations (e.g., complex assembly), the processor may ascertain whether the user has all of the necessary functional elements in his possession. FIGS. 11A-11E illustrate an application of the disclosed image processing system wherein the processor prompts the user to scan the inoperative product and related functional elements using mobile device 113e at various points during assembly/repair to confirm proper setup.

Figure 11A:
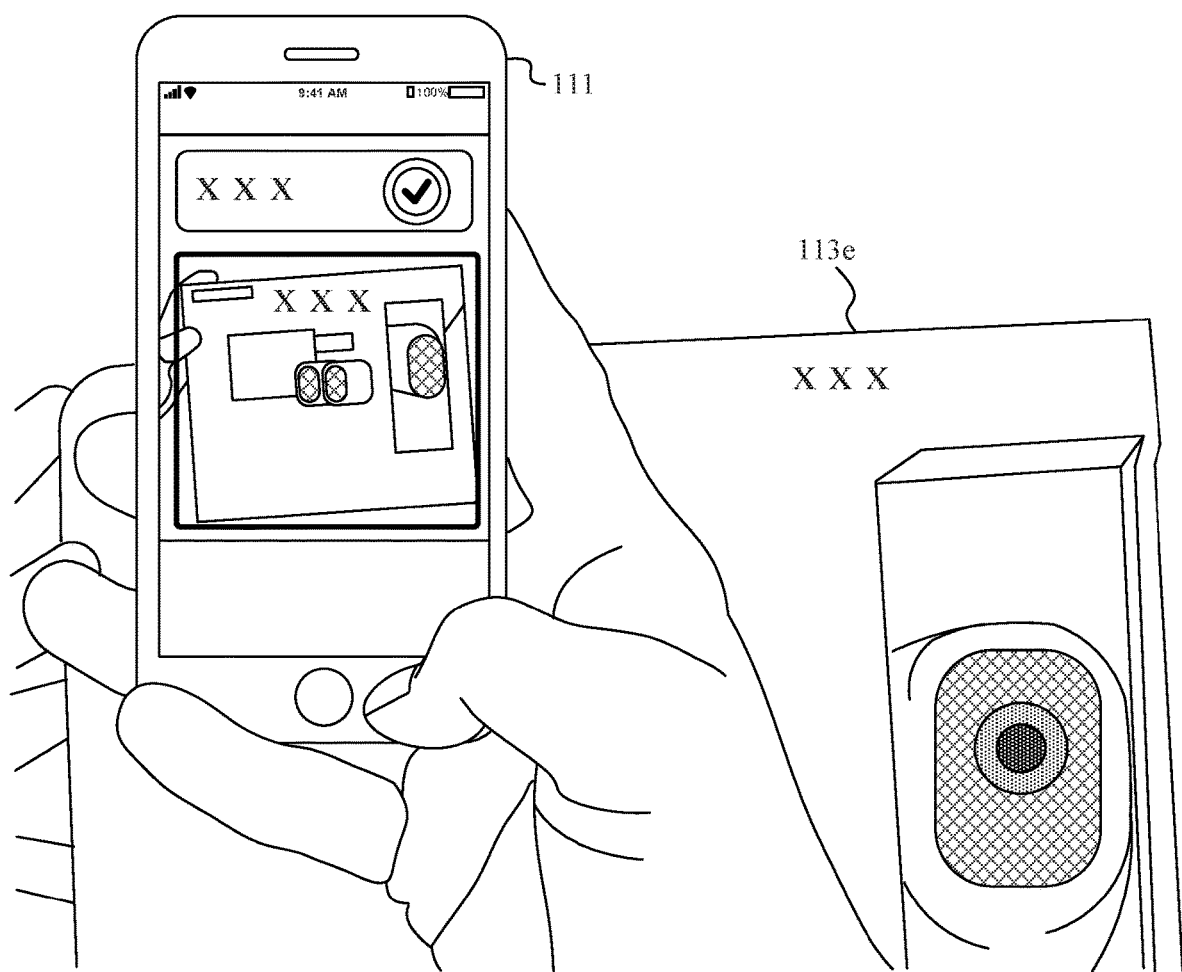
Figure 11D:
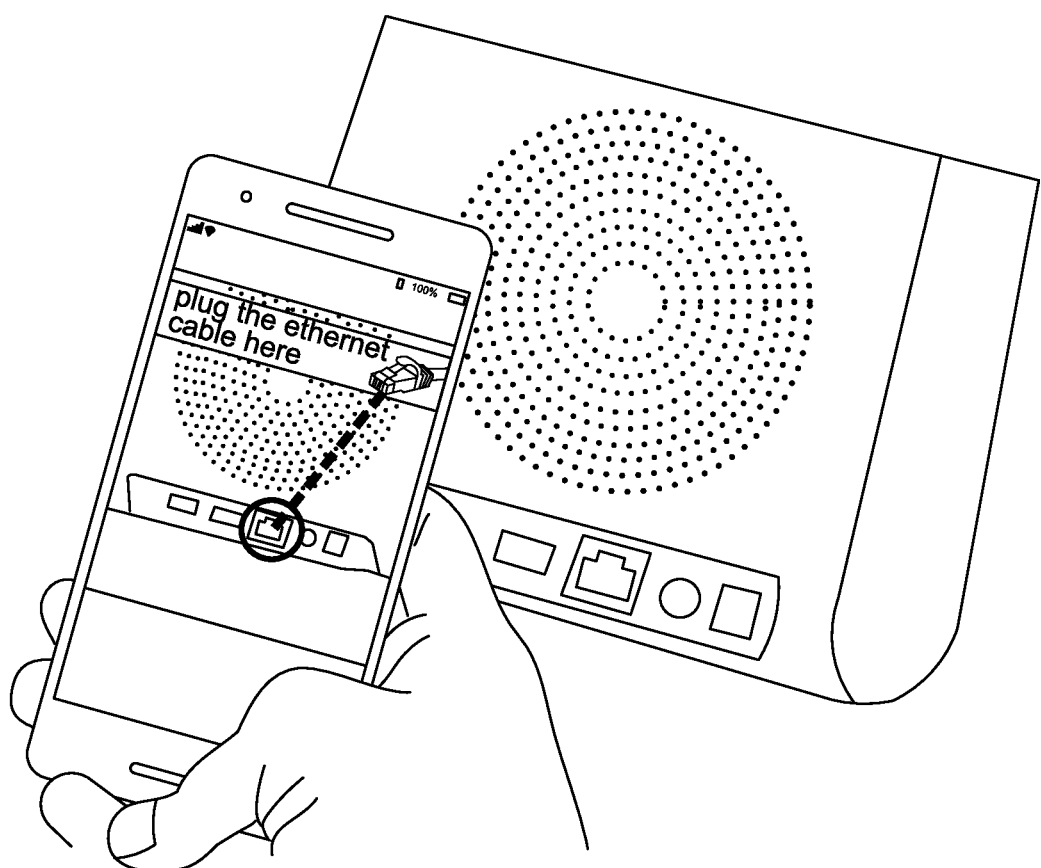
Figure 11E:
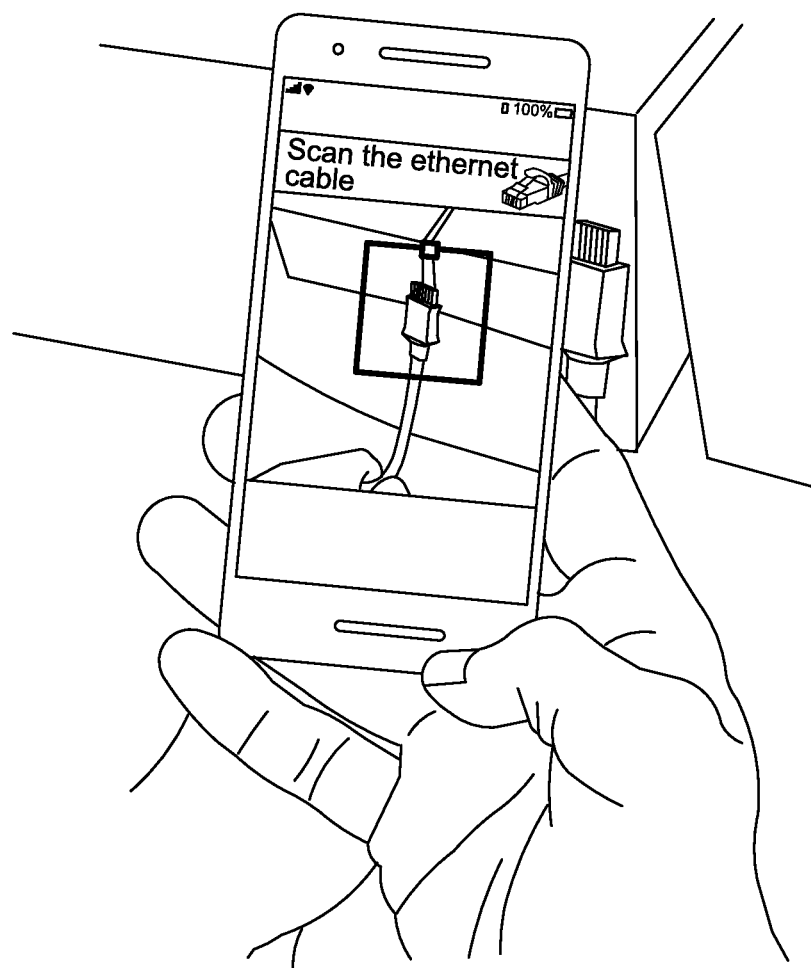
Figure 11F:
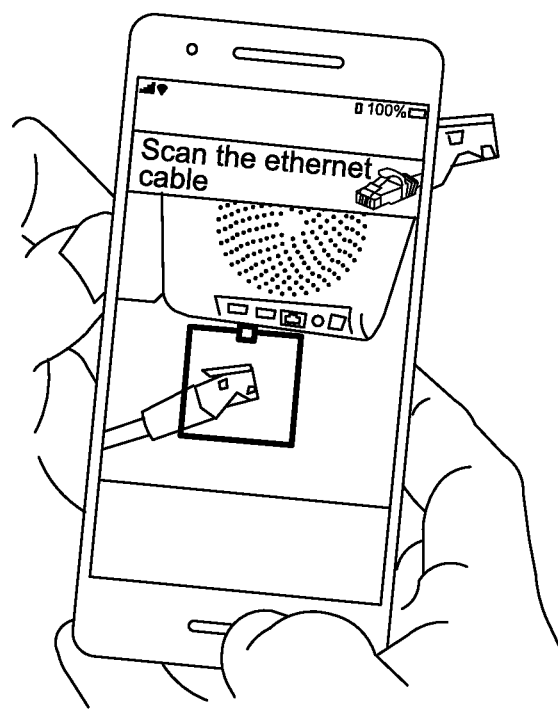

To begin, the processor identifies an appliance 111 using the product name or other labeling (illustrated as "XXX" in FIG. 11A). The processor then identifies various functional components of the appliance via the live video stream (FIGS. 11B-11C). The elements may be identified using the product's name, as shown in FIG. 11B or by alpha-numeric character (e.g. 1, 2, 3 . . . A, B, C . . . ). Next, as illustrated in FIG. 11D, the processor may superimpose a moveable augmented indicator onto the live video stream, instructing the user to connect one or more functional elements of the appliance. After the instruction is received, the user may confirm that he is connecting the correct functional element by placing the element within the image sensor field of view. Alternatively, the processor may prompt the user to bring the functional element within the field of view to ensure that the instruction is being properly followed. This is especially useful for saving time, as the processor is able to notify the user of a pending mistake before it occurs. In the embodiment illustrated herein, the user is instructed to insert an ethernet cable into a specific port of the appliance (FIG. 11D). The user is then prompted to scan the ethernet cable. If the incorrect cable is scanned (FIG. 11E), the user is notified, and the error is prevented. As discussed above, the notification may be a visual and/or audible message. Alternatively, the error notification may change color (e.g., from red to green) when the user scans the correct cable (see FIG. 11F).

Once assembly/repair is complete a data record relating to the support session is generated and saved in the database as discussed above with respect to FIGS. 4 and 5. The data record may include the number of error messages issued in a given support session. By keeping track of the user's error rate, the processor may determine the user's technical skill level so that future support sessions reflect the user's skill. For example, if the user commits numerous errors during the assembly/repair process, the processor may implement additional check scans or instructions to minimize future error. Conversely, if the user skips or speeds through one or more steps, the processor may reduce the number of overall steps in a subsequent session.

Figure 12:
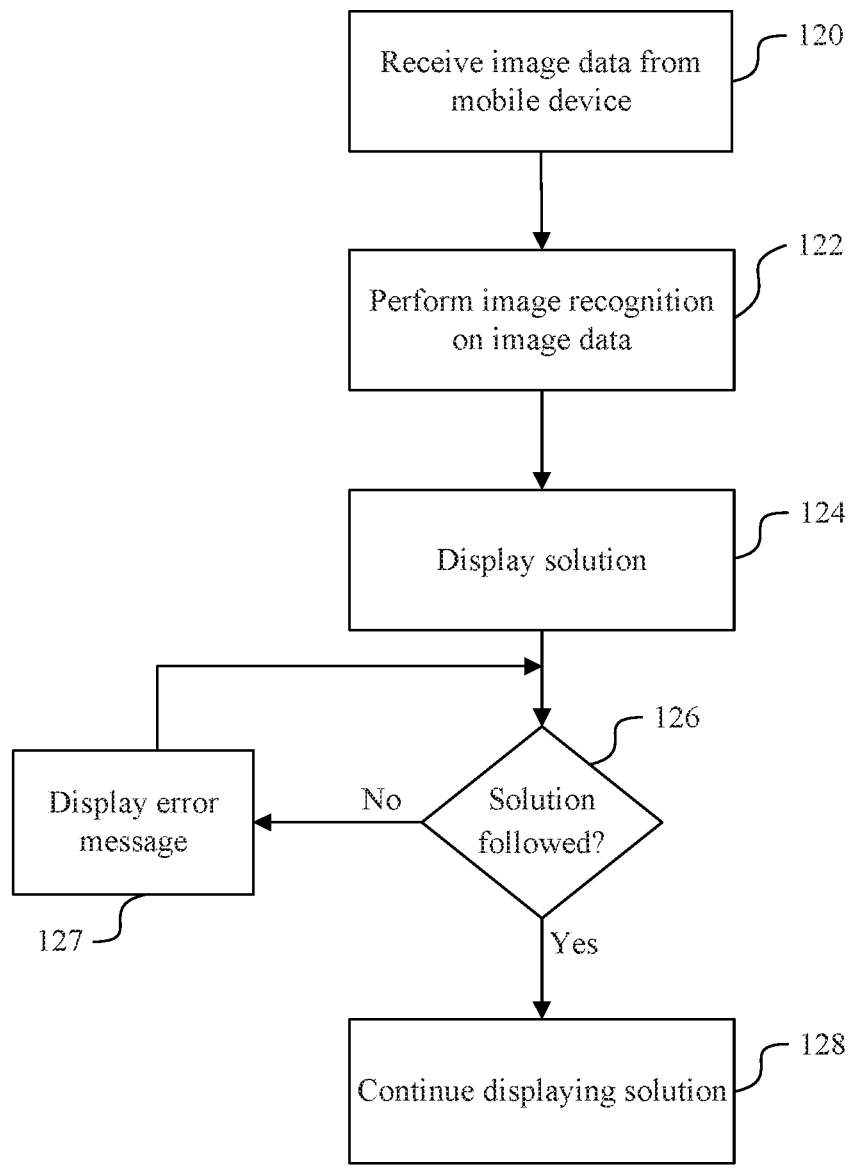
FIG. 12. is a flow chart illustrating a method for guiding a technical support session.

FIG. 12 is a flow chart illustrating a method for guiding a technical support session using the system disclosed above.

Mobile device 101 transmits and image processing system 60 receives real-time image data including images of an inoperative appliance 103e and various functional elements related thereto (step 120). The image processing system then performs image recognition on the image data to identify the appliance's likely source of inoperability (step 122). As discussed above with respect to FIG. 3, a processing utility 12p including image recognition, OCR, and image processing modules, is used to process the image data received from the user's mobile device and identify issues/defects related to the captured object. Once the source of inoperability is identified, the processor retrieves at least one solution from database 36r and causes the mobile device to display one or more sequential instructions relating to the solution (step 124). The inoperative product may include a plurality of functional elements, in which case, the instructions may include various steps for manipulating the functional elements. Instructions may be visual or audible as discussed above. As discussed above, the instructions may include moveable augmented indicators, written instructions or combinations thereof. Processor 60 may use tracker 36t to anchor the moveable augmented indicator to the product and/or functional elements thereof.

For each step of the repair/assembly of the inoperative appliance, the processor continuously scans the image data to determine whether and why the user committed an error (step 126). If the processor determines that an error has occurred, e.g., the user connected the wrong cable to the wrong port, or connected the cable up-side down, an error notification is displayed on the real-time image data (step 127). The error notification may include steps for correcting the error. For example, if the user attempts to insert a cable into a port upside-down, the error notification may instruct the user to correct the orientation of the cable.

In some embodiments, the method further includes assessing the user's technical skill based on the user's error rate and revising the instructions to accommodate the user's skill level when the error rate exceed a predetermined threshold. If the user makes numerous errors, for example, or the repair/assembly process is complex/requires numerous steps, the processor may instruct the user to scan a functional element prior to connecting it to the appliance to prevent errors from occurring. If the processor then determines that the error was corrected and that a step has been completed successfully, subsequent instructions will appear (step 128). This error checking cycle may occur at each step or after a predetermined number of steps. In some embodiments, the processor determines whether the particular instruction was subsequently complied with by determining an operational or positional state of a functional element of the inoperative product. For example, the processor may determine that instructions were complied with because a functional element, e.g., a switch, is in the "On" position, or a series of buttons on an electrical appliance have illuminated.

Methods for guiding the technical support session may be stored on various CRM. The instructions contained on the CRM may be executed by a processor to cause the processor to perform the method discussed above.

While live video streams are beneficial to enable real-time feedback during a support session, in certain situations, the system may rely on discrete images. FIGS. 13A-13D illustrate a support session wherein the image processing system instructs the user using discrete annotated images. The image processing system employs artificial intelligence to assist a user during technical support. The image processing system, comprises: at least one processor configured to: receive at least one first image of an inoperative product captured by a mobile device of a user; perform image analysis on the at least one first image to identify in the at least one first image a status of a functional element associated with the inoperative product; access memory to determine a reason why the product is inoperative based on the determined status of the functional element; cause visual guidance to be displayed by the mobile device, wherein the visual guidance is associated with a plurality of sequential actions for causing the inoperative product to become operative; receive at least one second image of the product, the second image being indicative of a completion of the plurality of sequential actions; perform image analysis on the at least one second image to determine that the completion of the plurality of sequential actions caused the inoperative product to become operative; and provide a notification to the user indicating problem resolution.

Figure 13A:
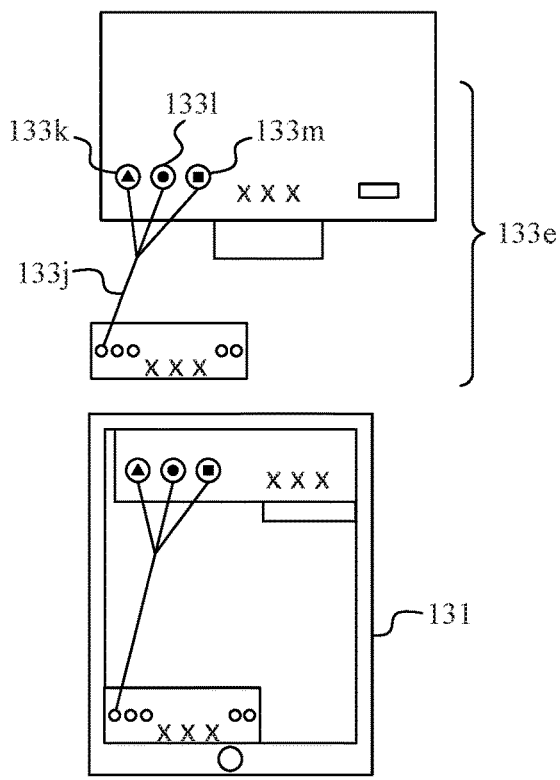
FIGS. 13A-13D illustrate an application of the image processing system in accordance with embodiments of the disclosure.

FIG. 13a illustrates configuration 133e comprising two electrical appliances and functional elements therebetween. An image of the configuration is captured and transmitted using a mobile device 131 and received by image processing system 60. The processor identifies the appliances and elements within the image and determines a source of inoperability using the data processing techniques described above. In some embodiments, the processor is configured to perform image analysis on the product to determine the product's model number, wherein the determined model number is used to select the visual guidance for display. The processor may retrieve instructions for rendering the inoperative appliance operative from database 36*r*, using the model number of the product.

Figure 13B:
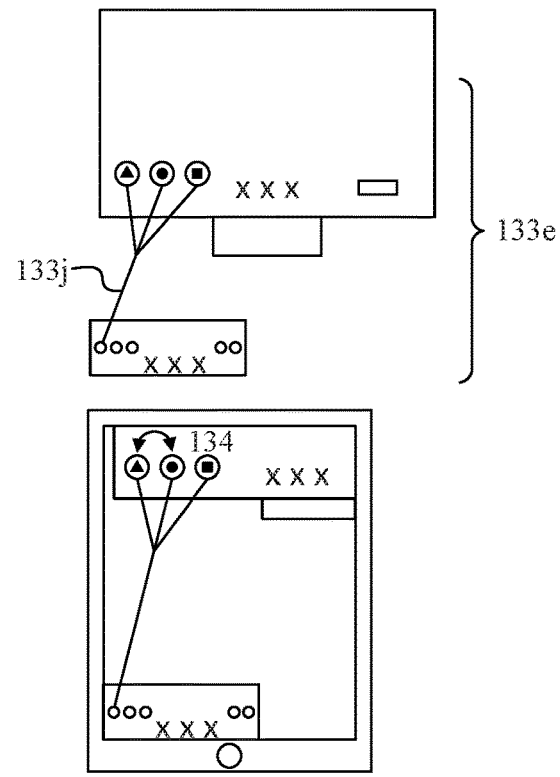
Figure 13C:
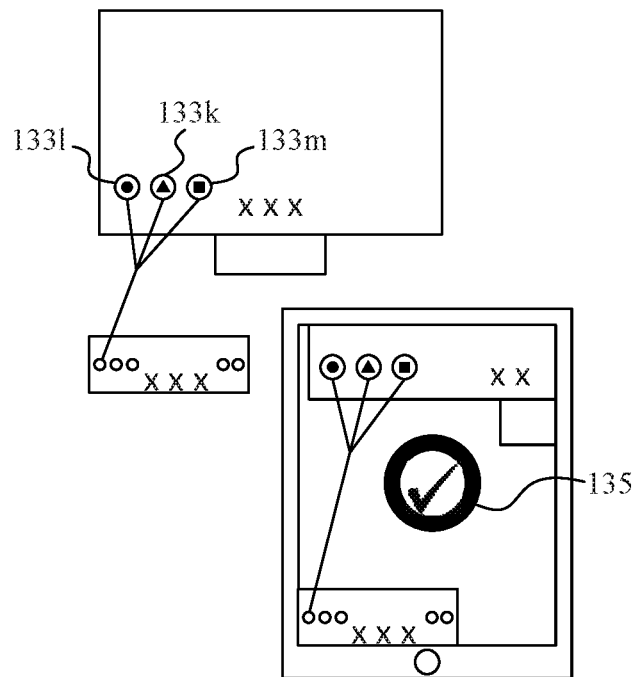

Once retrieved, the processor annotates the image with one or more instructions for correcting the source of inoperability. FIG. 13B illustrates an annotated image wherein functional elements 103*k*, 103*l* have been identified as being in the wrong port. Annotation 134 therefore directs the user to switch the position of elements 103*k* and 103*l* to correct the configuration. Once corrected, the user may submit another image of the configuration to the processor, and the processor may notify the user that the step was completed successfully using positive feedback, e.g. check mark 135 (FIG. 13C).

In some embodiments, the processor is further configured to check the inoperative product's operational status using a medium other than image analysis before providing the notice. For example, the processor may check for the presence or absence of Wi-fi to determine whether a router was properly repaired or installed.

Figure 13D:
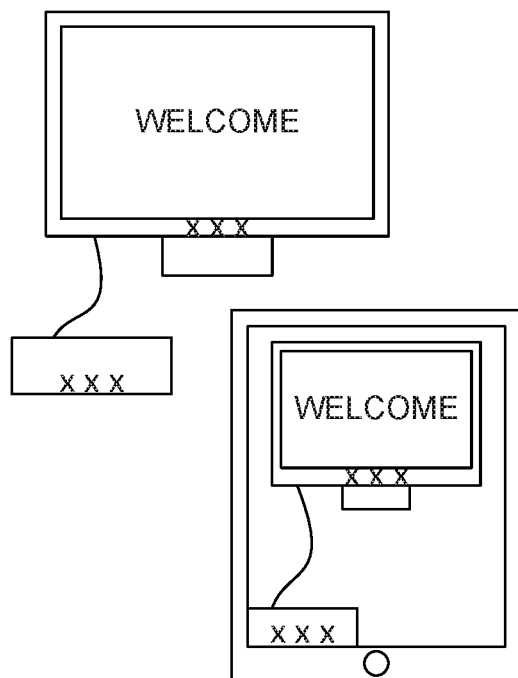

Before generating a new data record 51 in database 36*r*, the processor may prompt the user to test the functionality of the configuration. For example, the processor may cause the mobile device to visually or audibly instruct the user to "access the internet" to determine whether the instructions caused an inoperative router to become operative, or to turn on the TV to determine whether the instructions caused an inoperative TV to become operative. As illustrated in FIG. 13D, the user may capture an image of the operability. Once the image is received by the processor, it confirms that the solution and setup were successful, and the data record is recorded.

If the instructions are unsuccessful the user may be presented with an option to try again, or to receive human technical support. In the latter case, the processor may be configured to initiate a support session with a human operator when the processor determines that the completion of the plurality of sequential actions failed, or request that a technician be dispatched.

Figure 14:
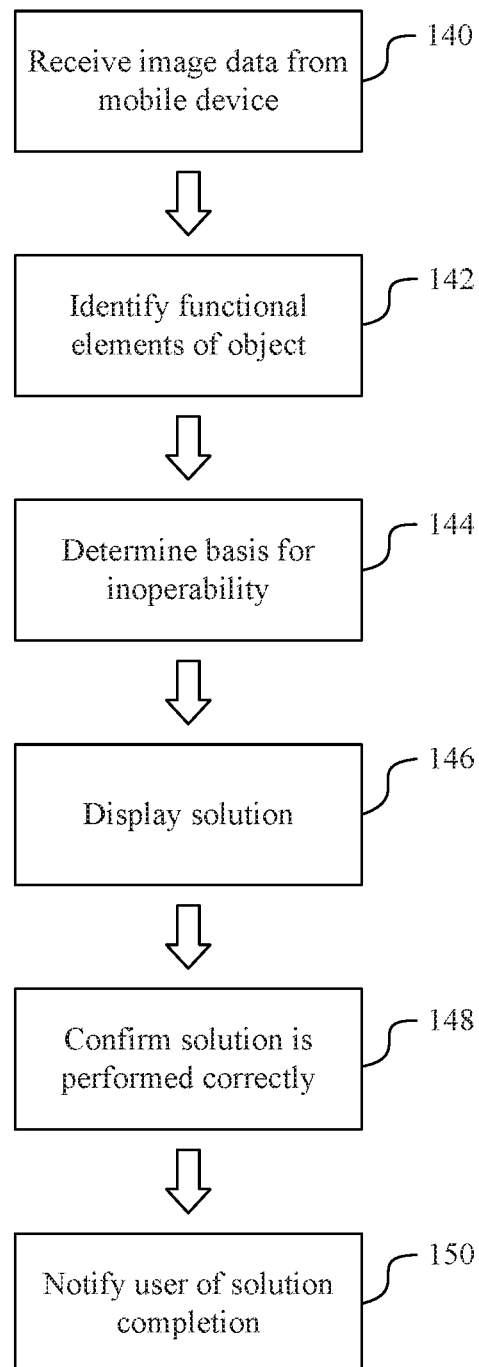
FIG. 14 is a flow chart illustrating a method for assisting a user during technical support.

FIG. 14 is a flow chart illustrating a method for assisting a user during technical support using the system described above.

To begin, a mobile device transmits and image processing system 60 receives at least one first image including an inoperative object and various functional elements relevant thereto (step 140). As discussed above, the functional elements may include one of a button, a switch, a trigger, a port, a cable, and an indicator light.

The image processing system then performs image recognition on the image to identify the appliance's likely source of inoperability (step 142). As discussed above with respect to FIG. 3, processing utility 12*p*, including image recognition, OCR, and image processing modules, is used to process the image data received from the user's mobile device, identify issues/defects related to the captured object (step 144). The identified issue may relate to the operational or positional state of any of the functional elements. For example, an unlit indicator light may indicate an issue with the power source, while a switch in a downward position may indicate that an appliance has not been turned on.

Once the source of inoperability is identified, the processor retrieves at least one solution from database 36*r* related to the assembly, repair, or correction of the inoperative object and causes the mobile device to display one or more annotations relating to the solution (step 146). In some embodiments, the annotations may be anchored to at least one functional element of the inoperative product, such that as a camera angle of the mobile device changes, the annotation remains anchored to the functional element.

After one or more steps relating to the solution are complete, a second image of the object and relevant functional elements are transmitted to the processor. Next, system 50 performs additional image analysis on the second image to determine whether the one or more steps were completed (step 148). The processor may also confirm that the object in the second image is a same object that was captured in the at least one first image.

Once it is confirmed that the solution was properly carried out, the processor may notify the user using positive feedback (step 150). The notification may be visually provided to the user's mobile device or audibly provided to the user via a speaker of the mobile device. Notifications may be provided after each step is completed and/or after all steps have been completed.

It is to be understood that the processor may provide negative feedback in the form of the error notification discussed above, and provide further instruction to facilitate assembly/repair. In some embodiments, a different set of sequential actions may be displayed when the processor determines, based on additional images, that the object remains inoperative. Consistent with other disclosed embodiments, methods for guiding the technical support session may be stored on various CRM. The instructions contained on the CRM may be executed by a processor to cause the processor to perform the method discussed above.

Although the system and method described herein relate to an electrical appliance, it is to be understood that the same principles apply to any of a variety of equipment or objects including, e.g., furniture. The system may, for example, identify a plurality of rails, a head board and a foot board, and instruct the user on proper assembly using one or more moveable augmented indicators.

It should also be understood that in the processes or methods described above, the steps of the processes/methods may be performed in any order or simultaneously, unless it is clear from the context that one step depends on another being performed first.

The technology disclosed herein can be implemented by software that can be integrated into existing CRM systems of technical support centers or organizations, and that can replace it or work in parallel thereto. Such software implementations combine opening a voiceless bi-directional video channel, when the customer's smartphone transmits the video image to the agent/expert, and the agent/expert gives the costumer audiovisual instructions over the communication channel.

Accordingly, the systems and methods disclosed herein enable users to proactively diagnose faulty item/equipment for increasing the productivity and efficiency, and to resolve issues faster based on a maintained pool of past working solutions. The user's mobile device, e.g., 31 is thereby harnessed to conduct support sessions and improve customer satisfaction, decrease technician dispatch rates for resolving user's problems, substantially improve the first call resolution rates, and decrease the average handling time.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As described hereinabove and shown in the associated figures, the present disclosure provides support session techniques, systems and methods, for expeditiously identifying product defects/other issues and corresponding working solutions for resolving problems encountered by remote users. While particular embodiments of the disclosure have been described, it will be understood, however, that the disclosure is not limited thereto, since modifications may be made by those skilled in the art, particularly in light of the foregoing teachings. As will be appreciated by the skilled person, the disclosure can be carried out in a great variety of ways, employing more than one technique from those described above, all without exceeding the scope of the claims.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in a database, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer readable medium for assisting a user during technical support, the computer readable medium including instructions that, when executed by at least one processor, cause the at least one processor to perform a method, the method comprising:
   receiving at least one first image of an inoperative product captured by a mobile device of a user;
   performing image analysis on the at least one first image to identify in the at least one first image a status of a functional element associated with the inoperative product;
   accessing memory to determine a reason why the product is inoperative based on the identified status of the functional element;
   causing visual guidance to be displayed by the mobile device, wherein the visual guidance is associated with a plurality of sequential actions for causing the inoperative product to become operative;
   receiving at least one second image of the product, the second image being indicative of a completion of the plurality of sequential actions;
   performing image analysis on the at least one second image to determine that the completion of the plurality of sequential actions caused the inoperative product to become operative; and
   providing a notification to the user indicating problem resolution.

2. The computer readable medium of claim 1, wherein the functional element includes at least one of a button, a switch, a trigger, a port, a cable, or an indicator light.

3. The computer readable medium of claim 1, wherein the identified status of the functional element includes at least one of an identified operational state of an indicator light, an identified position of a switch, or an identified location of a cable in a port.

4. The computer readable medium of claim 1, wherein the plurality of sequential actions are associated with an assembly process of the inoperative product.

5. The computer readable medium of claim 1, wherein the plurality of sequential actions are associated with a repair process of the inoperative product.

6. The computer readable medium of claim 1, wherein the visual guidance includes annotations anchored to at least one functional element of the inoperative product in received image data, such that as a camera angle of the mobile device changes, the annotation remains anchored to the functional element.

7. The computer readable medium of claim 1, the method further including:
   confirming that a product included in the at least one second image is a same product captured in the at least one first image.

8. The computer readable medium of claim 1, the method further including:
   receiving at least one additional image of the inoperative product upon completion of at least one of the sequential actions;
   analyzing the at least one additional image to identify in the additional image a change in an operational status of the inoperative product;
   accessing memory to determine a different set of sequential actions for causing the inoperative product to become operative, based on the change in the operational status; and
   causing visual guidance associated with the different set of sequential actions to display.

9. The computer readable medium of claim 1, the method further including causing the notification to be visually displayed on the user's mobile device.

10. The computer readable medium of claim 1, wherein the notification is audibly provided to the user via a speaker of the mobile device.

11. An image processing system employing artificial intelligence for assisting a user during technical support, the image processing system, comprising:
at least one processor configured to:
receive at least one first image of an inoperative product captured by a mobile device of a user;
perform image analysis on the at least one first image to identify in the at least one first image a status of a functional element associated with the inoperative product;
access memory to determine a reason why the product is inoperative based on the identified status of the functional element;
cause visual guidance to be displayed by the mobile device, wherein the visual guidance is associated with a plurality of sequential actions for causing the inoperative product to become operative;
receive at least one second image of the product, the second image being indicative of a completion of the plurality of sequential actions;
perform image analysis on the at least one second image to determine that the completion of the plurality of sequential actions caused the inoperative product to become operative; and
provide a notification to the user indicating problem resolution.

12. The image processing system of claim 11, wherein the at least one processor is further configured to perform image analysis on the product to identify the product, wherein the product identification is used to select the visual guidance for display.

13. The image processing system of claim 12, wherein the at least one processor is further configured to retrieve instructions from a database based on the product identification; wherein the instructions explain how to render the inoperative appliance operative, and are configured to guide a user to manipulate the functional element; and wherein the product identification includes at least one of a product model number, product brand, or product serial number.

14. The image processing system of claim 11, wherein the at least one processor is further configured to:
detect that the inoperative product is outside a field of view of an image sensor of the mobile device; and
suspend the visual guidance associated with a plurality of sequential actions while the inoperative product is outside the field of view.

15. The image processing system of claim 11, wherein the at least one processor is further configured to determine that the completion of the plurality of sequential actions caused the inoperative product to become operative by identifying a change in the status of the functional element.

16. The image processing system of claim 11, wherein the at least one processor is further configured to determine that the completion of the plurality of sequential actions caused the inoperative product to become operative by identifying a change in a status of another functional element.

17. The image processing system of claim 11, wherein the at least one processor is further configured to check the operability of the inoperative product using a medium other than image analysis before providing the notice.

18. The image processing system of claim 11, wherein the at least one processor is further configured to present to the user a request to test the product to confirm that the completion of the plurality of sequential actions caused the inoperative product to become operative.

19. The image processing system of claim 11, wherein the at least one processor is configured to initiate a support session with a human operator when the at least one processor determines that the completion of the plurality of sequential actions failed to render the inoperative product operative.

20. A method for assisting a user during technical support, the method comprising:
receiving at least one first image of an inoperative product captured by a mobile device of a user;
performing image analysis on the at least one first image to identify in the at least one first image a status of a functional element associated with the inoperative product;
accessing memory to determine a reason why the product is inoperative based on the identified status of the functional element;
causing visual guidance to be displayed by the mobile device, wherein the visual guidance is associated with at least one action for causing the inoperative product to become operative;
receiving at least one second image of the product, the second image being indicative of a completion of the at least one action;
performing image analysis on the at least one second image to determine whether the at least one action was completed properly; and
notifying the user when the at least one action is completed properly.

* * * * *